US012686134B2

(12) United States Patent
Hausman et al.

(10) Patent No.: US 12,686,134 B2
(45) Date of Patent: Jul. 21, 2026

(54) NATURAL LANGUAGE CONTROL OF A ROBOT

(71) Applicant: GOOGLE LLC, Mountain View, CA (US)

(72) Inventors: Karol Hausman, San Francisco, CA (US); Brian Ichter, Brooklyn, NY (US); Sergey Levine, Berkeley, CA (US); Alexander Toshev, San Francisco, CA (US); Fei Xia, Sunnyvale, CA (US); Carolina Parada, Denver, CO (US)

(73) Assignee: GOOGLE LLC, Mountain View, CA (US)

( * ) Notice: Subject to any disclaimer, the term of this patent is extended or adjusted under 35 U.S.C. 154(b) by 387 days.

(21) Appl. No.: 18/128,953

(22) Filed: Mar. 30, 2023

(65) Prior Publication Data

US 2023/0311335 A1      Oct. 5, 2023

Related U.S. Application Data

(60) Provisional application No. 63/326,080, filed on Mar. 31, 2022, provisional application No. 63/325,556, filed on Mar. 30, 2022.

(51) Int. Cl.
*B25J 13/00*          (2006.01)
*B25J 9/16*          (2006.01)
          (Continued)

(52) U.S. Cl.
CPC ............. *B25J 13/003* (2013.01); *B25J 9/161* (2013.01); *B25J 9/163* (2013.01); *B25J 11/0005* (2013.01); *G06F 40/40* (2020.01)

(58) Field of Classification Search
CPC . B25J 13/003; B25J 9/161; B25J 9/163; B25J 11/0005; B25J 11/008; B25J 9/1679;
          (Continued)

(56) References Cited

U.S. PATENT DOCUMENTS 9,430,463 B2 * 8/2016 Futrell ................... G06F 40/30
10,438,587 B1 * 10/2019 Lam ..................... G05D 1/2285
          (Continued)

FOREIGN PATENT DOCUMENTS

JP          2011054088          3/2011
JP          2020121381          8/2020

OTHER PUBLICATIONS

Devlin, J. et al., "BERT: Pre-training of Deep Bidirectional Transformers for Language Understanding;" arXiv preprint arXiv:1810. 04805v1; 14 pages; dated Oct. 11, 2018.
          (Continued)

*Primary Examiner* — Wade Miles
*Assistant Examiner* — James Brian Chin
(74) *Attorney, Agent, or Firm* — Gray Ice Higdon

(57)          ABSTRACT

Implementations process, using a large language model, a free-form natural language (NL) instruction to generate to generate LLM output. Those implementations generate, based on the LLM output and a NL skill description of a robotic skill, a task-grounding measure that reflects a probability of the skill description in the probability distribution of the LLM output. Those implementations further generate, based on the robotic skill and current environmental state data, a world-grounding measure that reflects a probability of the robotic skill being successful based on the current environmental state data. Those implementations further determine, based on both the task-grounding measure and the world-grounding measure, whether to implement the robotic skill.

20 Claims, 8 Drawing Sheets

(51) Int. Cl.
    *B25J 11/00*       (2006.01)
    *G06F 40/40*      (2020.01)
(58) Field of Classification Search
    CPC ......... B25J 9/1697; B25J 5/007; G06F 40/40;
                 G06F 40/30; G05B 2219/40202; G05B
                            2219/40411; G10L 15/18
    See application file for complete search history.

(56)             References Cited

U.S. PATENT DOCUMENTS

| | | | | |
|---|---|---|---|---|
| 2001/0040496 A1* | 11/2001 | Wang | .................... | G16H 40/63 |
| | | | | 704/E15.045 |
| 2016/0161946 A1* | 6/2016 | Wuth Sepulveda | . | G05D 1/0022 |
| | | | | 701/2 |
| 2017/0148434 A1* | 5/2017 | Monceaux | ........... | B25J 11/0015 |
| 2021/0232150 A1* | 7/2021 | Torii | .................... | G05D 1/249 |
| 2023/0259714 A1* | 8/2023 | Lange | ................... | G06F 40/237 |
| | | | | 704/9 |
| 2025/0147480 A1* | 5/2025 | Zhou | .................... | G05B 19/056 |

OTHER PUBLICATIONS

Raffel et al., "Exploring the Limits of Transfer Learning with a Unified Text-to-Text Transformer" Journal of Machine Learning Research 21 (2020) pp. 1-67, dated Jun. 2020.

Jang, E. et al., "BC-Z: Zero-Shot Task Generalization with Robotic Imitation Learning;" In 5th Annual Conference on Robot Learning (CoRL); 12 pages; dated 2021.

Kalashnikov, D. et al., "MT-Opt: Continuous Multi-Task Robotic Reinforcement Learning at Scale"; arXiv.org, arXiv:2104.08212v2; 18 pages; dated Apr. 27, 2021.

Ho, D. et al., "RetinaGAN: An Object-Aware Approach to Sim-to-Real Transfer;" In 2021 IEEE International Conference on Robotics and Automation (ICRA); 9 pages; dated 2021.

Shridhar, M. et al., "ALFRED: A Benchmark for Interpreting Grounded Instructions for Everyday Tasks;" In the IEEE Conference on Computer Vision and Pattern Recognition (CVPR) 2020; arxiv.org; arXiv:1912.01734v2; 18 pages; dated 2020.

Li, H.L. et al., "VisualBERT: A Simple and Performant Baseline for Vision and Language"; arXiv preprint arXiv:1908.03557; 14 pages; dated Aug. 9, 2019.

Humphreys et al., "A data-driven approach for learning to control computers" arXiv:2202.08137v1 [cs.LG], 15 pages, dated Feb. 16, 2022.

Macmahon, M. et al., "Walk the Talk: Connecting Language, Knowledge, And Action in Route Instructions;" Def, 2 (6):4; 8 pages; dated 2006.

Kollar, T. et al.; "Toward Understanding Natural Language Directions;" In 2010 5th ACM/IEEE International Conference on Human-Robot Interaction (HRI); pp. 259-266; dated 2010.

Hermann, K. M. et al., "Grounded Language Learning in a Simulated 3D World;" arXiv.org; arXiv:1706.06551v2; 22 pages; dated Jun. 26, 2017.

LaValle SM. "Planning Algorithms." Chapter 4, The Configuration Space. Cambridge University press; May 29, 2006. 32 pages, 2006.

Toussaint, M. et al., "Differentiable Physics and Stable Modes for Tool-Use and Manipulation Planning—Extended Abstract"; in proceedings of International Joint Conference on Artificial Intelligence; pp. 6231-6235; dated 2019.

Xu, D. et al., "Neural Task Programming: Learning to Generalize Across Hierarchical Tasks"; in International Conference on Robotics and Automation (ICRA): pp. 3795-3802; dated May 2018.

Bender, E. et al., "Climbing towards NLU: On Meaning, Form, and Understanding in the Age of Data"; In Proceedings of the 58th Annual Meeting of the Association for Computational Linguistics; pp. 5185-5198; dated Jul. 2020.

Vaswani, A. et al., "Attention Is All You Need"; Advances in Neural Information Processing Systems, 30; 11 pages; dated 2017.

Brown, T. et al., "Language Models Are Few-Shot Learners"; Advances in Neural Information Processing Systems 33; 25 pages; dated 2020.

Rae, J.W. et al., "Scaling Language Models: Methods, Analysis & Insights from Training Gopher"; Cornell University, arXiv.org, arXiv:2112.11446v1; 118 pages; dated Dec. 2021.

Thoppilan, R. et al., "LaMDA: Language Models for Dialog Applications"; arXiv.org, arXiv:2201.08239; 47 pages; dated 2022.

Wei, J. et al., "Finetuned Language Models are Zero-Shot Learners"; arXiv.org, arXiv:2109.01652; 47 pages; dated 2021.

Chowdhery, A. et al, "PaLM: Scaling Language Modeling with Pathways"; URL https://storage.googleapis.com/pathways-language-model/ PaLM-paper.pdf; 83 pages; dated 2022.

Gibson, J.J. "The Theory of Affordances"; The Ecological Approach to Visual Perception; 1(2); 15 pages; dated 1977.

Ouyang, L. et al., "Training Language Models to Follow Instructions with Human Feedback"; arXiv.org; arXiv:2203.0215; 68 pages; dated Mar. 2022.

Shah, D. et al., "Value Function Spaces: Skill-Centric State Abstractions for Long-Horizon Reasoning"; ICLR, arXiv.org, arXiv:2111. 03189v2; 21 pages; dated Mar. 2022.

Cer, D. et al., "Universal Sentence Encoder;" arXiv.org; arXiv:1803. 11175; 7 pages; dated 2018.

Srivastava, S. et al., "Behavior: Benchmark for Everyday Household Activities in Virtual, Interactive, And Ecological Environments;" In Conference on Robot Learning; 14 pages; dated Jan. 2022.

Hosseini, A. et al., "Understanding by Understanding Not: Modeling Negation in Language Models"; arXiv.org; arXiv:2105. 03519v1; 10 pages; dated May 2021.

Stepputtis, S. et al., "Language-Conditioned Imitation Learning for Robot Manipulation Tasks"; arXiv.org, arXiv:2010.12083v1; 12 pages; dated Oct. 22, 2020.

Nair, S. et al., "Learning Language-Conditioned Robot Behavior from Offline Data and Crowd-Sourced Annotation;" Conference on Robot Learning; 13 pages; PMLR; dated 2021.

Lynch, C. et al., "Grounding Language in Play;" arXiv.org. arXiv:2005. 07648; 23 pages; dated 2020.

Huang, W. et al., "Language Models as Zero-Shot Planners: Extracting Actionable Knowledge for Embodied Agents;" arXiv.org, arXiv:2201.07207; 33 pages; dated 2022.

Wei, J. et al., "Chain of Thought Prompting Elicits Reasoning in Large Language Models"; arXiv.org. arXiv:2201.11903; 41 pages; dated 2022.

Huang, W. et al., "Inner Monologue: Embodied Reasoning Through Planning with Language Models", arXiv.org, arXiv:2207.05608v1; 25 pages; dated Jul. 2022.

Shridhar, M. et al., "CLIPort: What and Where Pathways for Robotic Manipulation"; In Conference on Robot Learning; 13 pages; dated 2022.

Gu, X. et al., "Open-Vocabulary Object Detection Via Vision and Language Knowledge Distillation;" arXiv preprint arXiv:2104. 13921; 19 pages; dated 2021.

Siskind, J.M., "Grounding Language in Perception"; Artificial Intelligence Review; 21 pages; dated 1994.

Sun, C. et al., "VideoBERT: A Joint Model for Video and Language Representation Learning"; In Proceedings of the IEEE/CVF International Conference on Computer Vision; 10 pages; dated 2019.

Lu, J. et al., "ViLBERT: Pretraining Task—Agnostic Visiolinguistic Representations for Vision-and-Language Tasks"; Advances in Neural Information Processing Systems; 11 pages; dated 2019.

Zellers, R. et al., "Merlot: Multi-Modal Neural Script Knowledge Models"; Advances in Neural Information Processing Systems; 18 pages; dated 2021.

Radford, A et al., "Learning Transferable Visual Models From Natural Language Supervision"; In International Conference on Machine Learning; 16 pages; dated 2021.

Suglia, A. et al., "Embodied BERT: A Transformer Model for Embodied, Language-guided Visual Task Completion"; arXiv preprint arXiv:2108.04927; 18 pages; dated Aug. 2021.

Pashevich, A. et al, "Episodio Transformer for Vision-and-Language Navigation"; In Proceedings of the IEEE/CVF International Conference on Computer Vision; 11 pages; dated 2021.

(56) References Cited

OTHER PUBLICATIONS

Sharma, P. et al., "Skill Induction and Planning with Latent Language"; arXiv preprint arXiv:2110.01517; 13 pages; dated Oct. 2021.
Hill, F. et al., Human Instruction—Following with Deep Reinforcement Learning via Transfer-Learning from Text; arXiv.org, arXiv:2005.09382; 19 pages; dated May 2020.
Blukis, V. et al., "A Persistent Spatial Semantic Representation for High-Level Natural Language Instruction Execution"; In Conference on Robot Learning; 12 pages; dated 2022.
Nair, S. et al., "R3M: A Universal Visual Representation for Robot Manipulation"; arXiv preprint arXiv:2203.12601; 17 pages; dated 2022.
Akakzia, A. et al., "Grounding Language to Autonomously-Acquired Skills Via Goal Generation"; arXiv.org; arXiv:2006.07185; 21 pages; dated 2021.
Zellers, R. et al., "PIGLeT: Language Grounding Through Neuro-Symbolic Interaction in a 3D World"; arXiv.org; arXiv:2106.00188;14 pages; dated Jun. 2021.
Reid, M. et al., "Can Wikipedia Help Offline Reinforcement Learning"; arXiv preprint arXiv:2201.12122; 16 pages; dated 2022.
Li, S. et al., "Pre-Trained Language Models for Interactive Decision-Making"; arXiv preprint arXiv:2202.01771; 17 pages; dated 2022.
Tellex, S. et al., "Understanding Natural Language Commands for Robotic Navigation and Mobile Manipulation"; Twenty-Fifth AAAI Conference on Artificial Intelligence; vol. 25, No. 1; 8 pages; dated 2011.
Luketina, J. et al., "A Survey of Reinforcement Learning Informed by Natural Language"; In Proceedings of the 28th International Joint Conference on Artificial Intelligence (IJCAI); 9 pages; dated 2019.
Tellex, S. et al., "Robots that Use Language"; Annual Review of Control, Robotics, and Autonomous Systems, 33 pages; dated 2020.
Mei, H. et al., "Listen, Attend, and Walk: Neural Mapping of Navigational Instructions to Action Sequences"; In Proceedings of the 30th AAAI Conference on Artificial Intelligence; 7 pages; dated 2016.
Misra, D. et al., "Mapping Instructions and Visual Observations to Actions with Reinforcement Learning"; In Proceedings of Conference on Empirical Methods in Natural Language Processing (EMNLP); 12 pages; dated 2017.
Jiang, Y. et al., "Language as an Abstraction for Hierarchical Deep Reinforcement Learning"; In 33rd Conference on Neural Information Processing Systems (NeurIPS); 13 pages; dated 2019.
Cideron, G. et al., "Self-Educated Language Agent with Hindsight Experience Replay for Instruction Following"; arXiv.org, arXiv:1910.09451; 17 pages; dated 2019.
Goyal, P. et al., "PixL2R: Guiding Reinforcement Learning Using Natural Language by Mapping Pixels to Rewards"; arXiv.org, arXiv:2007.15543; 13 pages; dated 2020.
Oh, J. et al., "Zero-Shot Task Generalization with Multi-Task Deep Reinforcement Learning"; arXiv.org, arXiv:1706.05064; 16 pages; dated 2017.
Andreas, J. et al., "Modular Multitask Reinforcement Learning with Policy Sketches"; arXiv.org, arXiv:1611.01796; 11 pages; dated 2017.
Srivastava, S. et al., "Combined Task and Motion Planning Through an Extensible Planner-Independent Interface Layer"; In 2014 IEEE International Conference on Robotics and Automation (ICRA); pp. 639-646; dated 2014.
Fikes, R.E. et al., "Strips: A New Approach to the Application of Theorem Proving to Problem Solving"; Artificial intelligence; p. 189-208; dated 1971.
Sacerdoti, E.D., "A Structure for Plans and Behavior"; Technical Report, SRI International, Menlo Park California Artificial Intelligence Center; 162 pages; dated 1975.
Nau, D. et al., "SHOP: Simple Hierarchical Ordered Planner"; In Proceedings of the 16th International Joint Conference on Artificial Intelligence; pp. 968-973; dated 1999.

Toussaint, M., "Logic-Geometric Programming: An Optimization-Based Approach to Combined Task and Motion Planning"; In Twenty-Fourth International Joint Conference on Artificial Intelligence; 7 pages; dated 2015.
Xu, D. et al., "Regression Planning Networks"; Advances in Neural Information Processing Systems; 11 pages; dated 2019.
Huang, D-A. et al., "Neural Task Graphs: Generalizing to Unseen Tasks from a Single Video Demonstration"; In Proceedings of the IEEE/CVF Conference on Computer Vision and Pattern Recognition; 10 pages; dated 2019.
Eysenbach, B. et al., "Search on the Replay Buffer: Bridging Planning and Reinforcement Learning"; Advances in Neural Information Processing Systems; 12 pages; dated 2019.
Savinov, N. et al., "Semi-parametric Topological Memory for Navigation"; arXiv preprint arXiv:1803.00653; 16 pages; dated Mar. 2018.
Ichter, B. et al., "Broadly-Exploring, Local-Policy Trees for Long-Horizon Task Planning" Conference on Robot Learning (CoRL); 11 pages; dated 2021.
Matuszek, C. et al., "A Joint Model of Language and Perception for Grounded Attribute Learning"; arXiv.org; arXiv:1206.6423; 8 pages; dated Jun. 2012.
Silver, T. et al., "Inventing Relational State and Action Abstractions for Effective and Efficient Bilevel Planning"; arXiv.org; arXiv:2203.09634; 30 pages; dated 2022.
Garrett, R. et al., "Online Replanning in Belief Space for Partially Observable Task and Motion Problems"; In 2020 IEEE International Conference on Robotics and Automation (ICRA); 8 pages; dated Mar. 2020.
Zhu, Y. et al., "Visual Semantic Planning using Deep Successor Representations"; In Proceedings of the IEEE International Conference on Computer Vision; 10 pages; dated 2017.
Misra, D.K. et al., "Tell Me Dave: Context-Sensitive Grounding of Natural Language to Manipulation Instructions"; The International Journal of Robotics Research, vol. 35; pp. 281-300; dated 2016.
Wu, B. et al., "Example-Driven Model-Based Reinforcement Learning for Solving Long-Horizon Visuomotor Tasks"; In 5th Annual Conference on Robot Learning (CoRL); 13 pages; dated 2021.
Nair, S. et al., "Hierarchical Foresight: Self-Supervised Learning of Long-Horizon Tasks via Visual Subgoal Generation"; ArXiv.org; arXiv:1909.05829v1; dated Sep. 2019.
Xia, F. et al., "ReLMoGen: Integrating Motion Generation in Reinforcement Learning for Mobile Manipulation"; In 2021 IEEE International Conference on Robotics and Automation (ICRA); pp. 4583-4590; dated 2021.
Li, C. et al., "HRL4IN: Hierarchical Reinforcement Learning for Interactive Navigation with Mobile Manipulators"; In Conference on Robot Learning; 14 pages; dated 2020.
Bender, E.M. et al., "On the Dangers of Stochastic Parrots: Can Language Models Be Too Big?"; In Proceedings of the 2021 ACM Conference on Fairness, Accountability, and Transparency; pp. 610-623; dated 2021.
Bommasani, R. et al., "On the Opportunities and Risks of Foundation Models"; arXiv.org; arXiv:2108.07258; 212 pages; dated 2021.
Chebotar, Y. et al., "Actionable Models: Unsupervised Offline Reinforcement Learning of Robotic Skills"; ArXiv.org; arXiv:2104.07749; 11 pages; dated 2021.
Tellex, S. et al., "Asking for Help Using Inverse Semantics"; MIT Robotics: Science and Systems X; 9 pages; dated 2014.
Wang, S.I., et al., Learning Language Games through Interaction; arXiv.org; arXiv:1606.02447v1; 11 pages; dated Jun. 2016.
Xiao, T. et al., "Thinking While Moving: Deep Reinforcement Learning with Concurrent Control"; In International Conference on Learning Representations; 17 pages; dated 2019.
Schaul, T. et al., "Prioritized Experience Replay"; In ICLR, 21 pages; dated Feb. 2016.
European Patent Office; International Search Report and Written Opinion issued in Application No. PCT/US2023/016932; 12 pages; dated Jul. 6, 2023.
Graves, D. et al.; Affordance as General Value Function: A Computational Model; arXiv:2010.14289v.3, 51 pages, dated May 8, 2021.

(56) References Cited

OTHER PUBLICATIONS

Korean Patent Office, Office Action issued in Application No. 1020247032325, 34 pages, dated Nov. 17, 2025.

Australian Patent Office, First Examination Report issued in Application No. 2023241710, 3 pages, dated Aug. 18, 2025.

Intellectual Property India, Examination Report issued in Application No. 202417067536, 9 pages, dated Mar. 5, 2026.

Japanese Patent Office, Notice of Refusal issued in Application No. 2024557754, 22 pages, dated Oct. 21, 2025.

* cited by examiner

105

*Bring me a snack from the table*

110

111

114

101

115

113

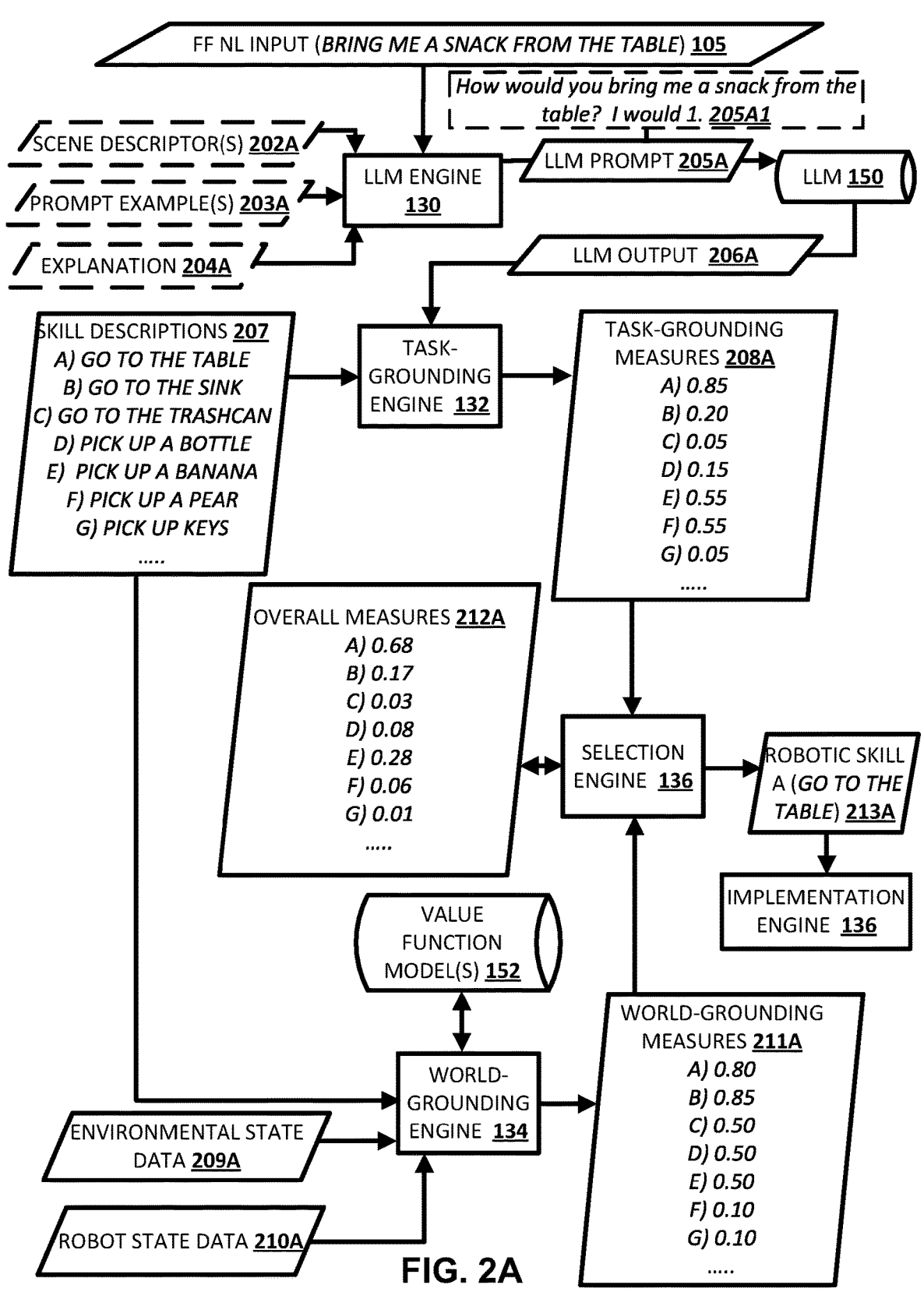

FF NL INPUT (*BRING ME A SNACK FROM THE TABLE*) 105

How would you bring me a snack from the table? I would 1. 205A1

SCENE DESCRIPTOR(S) 202A

PROMPT EXAMPLE(S) 203A

EXPLANATION 204A

LLM ENGINE 130

LLM PROMPT 205A

LLM 150

LLM OUTPUT 206A

SKILL DESCRIPTIONS 207
A) GO TO THE TABLE
B) GO TO THE SINK
C) GO TO THE TRASHCAN
D) PICK UP A BOTTLE
E) PICK UP A BANANA
F) PICK UP A PEAR
G) PICK UP KEYS
.....

TASK-GROUNDING ENGINE 132

TASK-GROUNDING MEASURES 208A
A) 0.85
B) 0.20
C) 0.05
D) 0.15
E) 0.55
F) 0.55
G) 0.05
.....

OVERALL MEASURES 212A
A) 0.68
B) 0.17
C) 0.03
D) 0.08
E) 0.28
F) 0.06
G) 0.01
.....

SELECTION ENGINE 136

ROBOTIC SKILL A (*GO TO THE TABLE*) 213A

IMPLEMENTATION ENGINE 136

VALUE FUNCTION MODEL(S) 152

WORLD-GROUNDING ENGINE 134

ENVIRONMENTAL STATE DATA 209A

ROBOT STATE DATA 210A

WORLD-GROUNDING MEASURES 211A
A) 0.80
B) 0.85
C) 0.50
D) 0.50
E) 0.50
F) 0.10
G) 0.10
.....

FIG. 2A

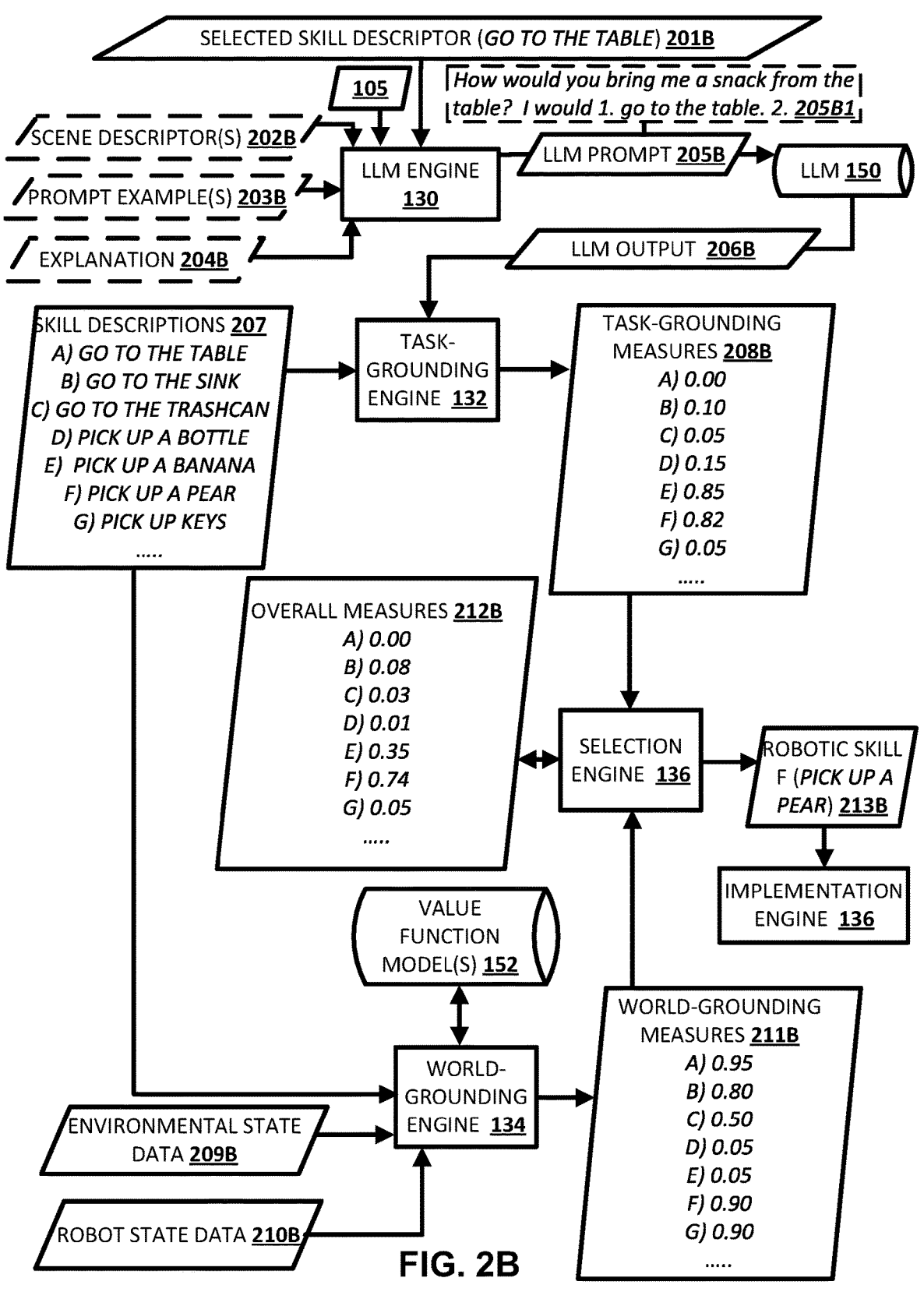

SELECTED SKILL DESCRIPTOR (*GO TO THE TABLE*) 201B

105

*How would you bring me a snack from the table? I would 1. go to the table. 2.* 205B1

SCENE DESCRIPTOR(S) 202B

PROMPT EXAMPLE(S) 203B

EXPLANATION 204B

LLM ENGINE 130

LLM PROMPT 205B

LLM 150

LLM OUTPUT 206B

SKILL DESCRIPTIONS 207
A) *GO TO THE TABLE*
B) *GO TO THE SINK*
C) *GO TO THE TRASHCAN*
D) *PICK UP A BOTTLE*
E) *PICK UP A BANANA*
F) *PICK UP A PEAR*
G) *PICK UP KEYS*
.....

TASK-GROUNDING ENGINE 132

TASK-GROUNDING MEASURES 208B
A) 0.00
B) 0.10
C) 0.05
D) 0.15
E) 0.85
F) 0.82
G) 0.05
.....

OVERALL MEASURES 212B
A) 0.00
B) 0.08
C) 0.03
D) 0.01
E) 0.35
F) 0.74
G) 0.05
.....

SELECTION ENGINE 136

ROBOTIC SKILL F (*PICK UP A PEAR*) 213B

IMPLEMENTATION ENGINE 136

VALUE FUNCTION MODEL(S) 152

WORLD-GROUNDING ENGINE 134

WORLD-GROUNDING MEASURES 211B
A) 0.95
B) 0.80
C) 0.50
D) 0.05
E) 0.05
F) 0.90
G) 0.90
.....

ENVIRONMENTAL STATE DATA 209B

ROBOT STATE DATA 210B

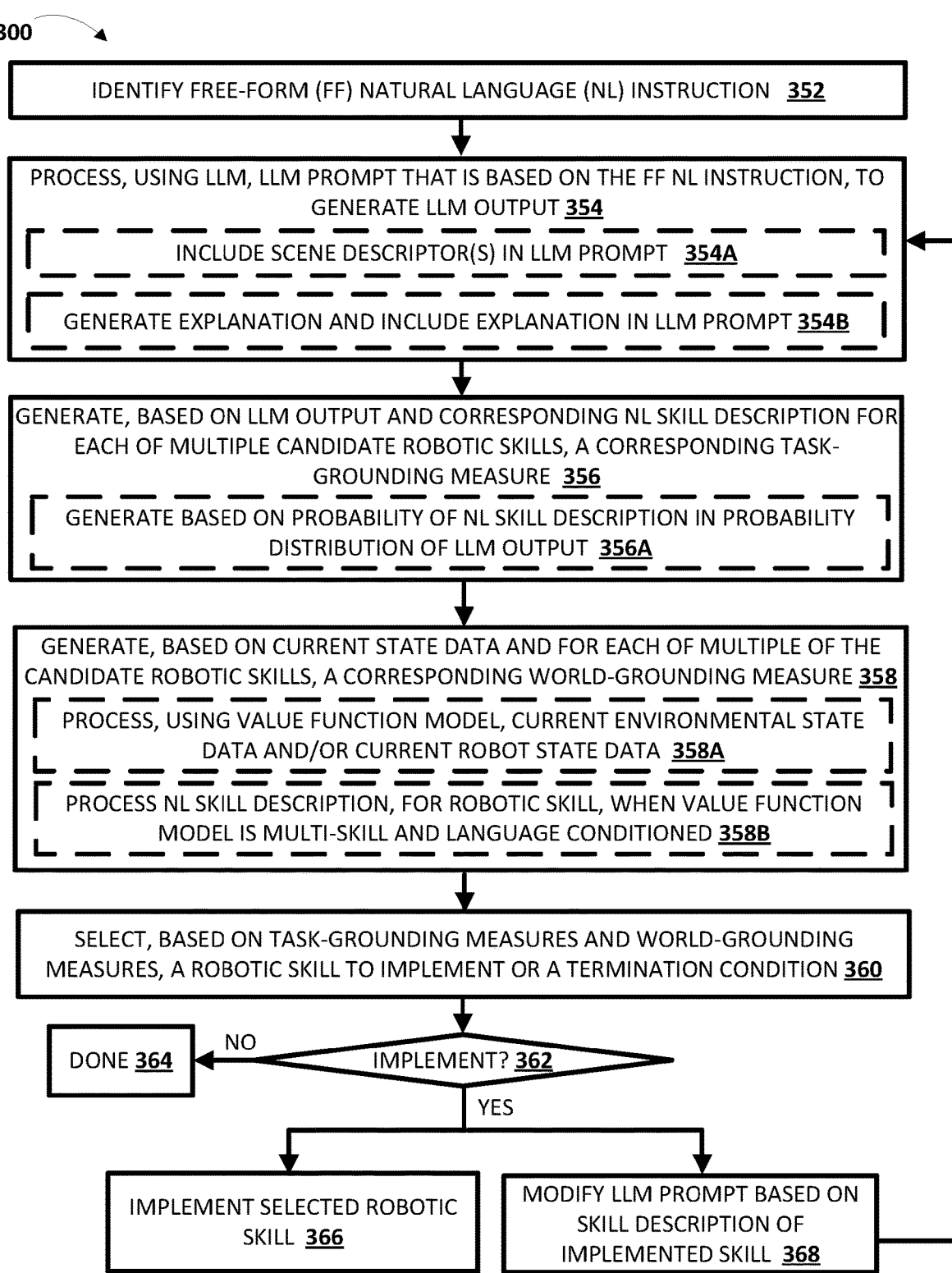

IDENTIFY FREE-FORM (FF) NATURAL LANGUAGE (NL) INSTRUCTION  352

PROCESS, USING LLM, LLM PROMPT THAT IS BASED ON THE FF NL INSTRUCTION, TO GENERATE LLM OUTPUT 354

INCLUDE SCENE DESCRIPTOR(S) IN LLM PROMPT  354A

GENERATE EXPLANATION AND INCLUDE EXPLANATION IN LLM PROMPT 354B

GENERATE, BASED ON LLM OUTPUT AND CORRESPONDING NL SKILL DESCRIPTION FOR EACH OF MULTIPLE CANDIDATE ROBOTIC SKILLS, A CORRESPONDING TASK-GROUNDING MEASURE 356

GENERATE BASED ON PROBABILITY OF NL SKILL DESCRIPTION IN PROBABILITY DISTRIBUTION OF LLM OUTPUT 356A

GENERATE, BASED ON CURRENT STATE DATA AND FOR EACH OF MULTIPLE OF THE CANDIDATE ROBOTIC SKILLS, A CORRESPONDING WORLD-GROUNDING MEASURE 358

PROCESS, USING VALUE FUNCTION MODEL, CURRENT ENVIRONMENTAL STATE DATA AND/OR CURRENT ROBOT STATE DATA  358A

PROCESS NL SKILL DESCRIPTION, FOR ROBOTIC SKILL, WHEN VALUE FUNCTION MODEL IS MULTI-SKILL AND LANGUAGE CONDITIONED 358B

SELECT, BASED ON TASK-GROUNDING MEASURES AND WORLD-GROUNDING MEASURES, A ROBOTIC SKILL TO IMPLEMENT OR A TERMINATION CONDITION 360

DONE 364     NO     IMPLEMENT? 362

YES

IMPLEMENT SELECTED ROBOTIC SKILL 366

MODIFY LLM PROMPT BASED ON SKILL DESCRIPTION OF IMPLEMENTED SKILL 368

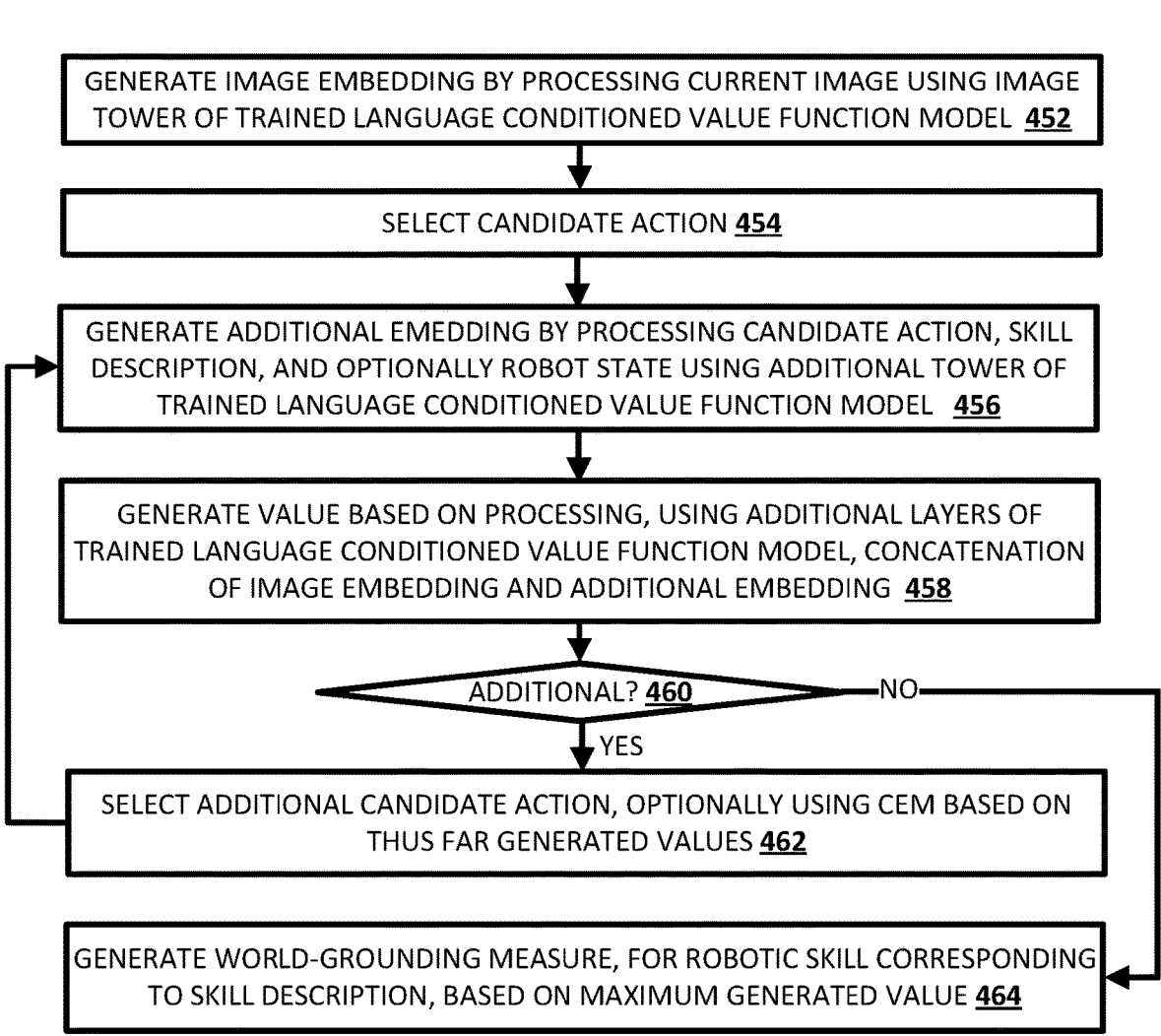

GENERATE IMAGE EMBEDDING BY PROCESSING CURRENT IMAGE USING IMAGE TOWER OF TRAINED LANGUAGE CONDITIONED VALUE FUNCTION MODEL 452

SELECT CANDIDATE ACTION 454

GENERATE ADDITIONAL EMEDDING BY PROCESSING CANDIDATE ACTION, SKILL DESCRIPTION, AND OPTIONALLY ROBOT STATE USING ADDITIONAL TOWER OF TRAINED LANGUAGE CONDITIONED VALUE FUNCTION MODEL 456

GENERATE VALUE BASED ON PROCESSING, USING ADDITIONAL LAYERS OF TRAINED LANGUAGE CONDITIONED VALUE FUNCTION MODEL, CONCATENATION OF IMAGE EMBEDDING AND ADDITIONAL EMBEDDING 458

ADDITIONAL? 460 —NO—

↓ YES

SELECT ADDITIONAL CANDIDATE ACTION, OPTIONALLY USING CEM BASED ON THUS FAR GENERATED VALUES 462

GENERATE WORLD-GROUNDING MEASURE, FOR ROBOTIC SKILL CORRESPONDING TO SKILL DESCRIPTION, BASED ON MAXIMUM GENERATED VALUE 464

FIG. 4

NATURAL LANGUAGE CONTROL OF A ROBOT

BACKGROUND

Many robots are programmed to perform certain tasks. For example, a robot on an assembly line can be programmed to recognize certain objects, and perform particular manipulations to those certain objects.

Further, some robots can perform certain tasks in response to explicit user interface input that corresponds to the certain task. For example, a vacuuming robot can perform a general vacuuming task in response to a spoken utterance of "robot, clean". However, typically, user interface inputs that cause a robot to perform a certain task must be mapped explicitly to the task. Accordingly, a robot can be unable to perform certain tasks in response to various free-form natural language inputs of a user attempting to control the robot.

SUMMARY

Language models (LMs) have been developed that can be used to process natural language (NL) content and/or other input(s), to generate LM output that that reflects NL content and/or other content that is responsive to the input(s). For example, large language models (LLMs) have been developed that are trained on massive amounts of data and are able to be utilized to robustly process a wide range of NL inputs and generate corresponding LM output that reflects corresponding NL content that is accurate and responsive to the NL input. An LLM can include at least hundreds of millions of parameters and can often include at least billions of parameters, such as one hundred billion or more parameters. An LLM can, for example, be a sequence-to-sequence model, Transformer-based, and/or include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

Separately, efforts have been made in attempting to enable robust free-form (FF) NL control of robot. For example, to enable a robot to react appropriately in response to any one of a variety of different typed or spoken instructions from a human that are directed to the robot. For instance, in response to a FF NL instruction of "put the blocks in the toy bin", to be able to perform a robotic task that includes (a) navigating to the "blocks", (b) picking up the "blocks", (c) navigating to the "toy bin", and (d) placing the "blocks" in the "toy bin".

Implementations disclosed herein recognize that LMs, such as LLMs, can encode a wealth of semantic knowledge about the world, and that such knowledge can be useful to robots in acting upon high-level, temporally extended instructions expressed in a FF NL instruction. Implementations disclosed herein further recognize that a drawback of LLMs is that they lack real-world experience, such as real-world experience in robotic control, and/or that they lack any grounding to current real-world condition(s). For example, prompting an LLM with "I spilled my drink on the table, can you help" can result in generation of LLM output that reflects NL content that is descriptive of reasonable step(s) for cleaning a spill. For instance, the highest probability decoding of the LLM output can reflect NL content of "you could try using a vacuum". However, "you could try using a vacuum" may not be applicable to a particular agent, such as a robot, that needs to perform this task in a particular environment. For example, the robot may not have an integrated vacuum and may not have access to any separate vacuum in the particular environment, or may be incapable of controlling a separate vacuum in the particular environment.

Implementations disclosed herein leverage LM output in determining how to control a robot to perform a task in response to a FF NL input that: describes the task at a high-level; and fails to describe all (or even any) of the robotic skill(s) that are needed to perform the task. However, in view of recognized drawback(s) of LMs, implementations described herein utilize one or more techniques to ground the LM output so that robotic skill(s), that are selected based on the LM output for performance in response to the FF NL input, are robotic skill(s) that are both feasible (e.g., performable by the robot) and contextually appropriate (e.g., likely to succeed if performed by the robot in the particular environment). More particularly, implementations ground the LM output through consideration of not only the LM output, but also of robotic skills that are performable by a robot, such as pre-trained robotic skills.

As a non-limiting working example of some of those implementations, assume that a user provides an FF NL instruction of "I spilled my drink on the table, can you help". An LLM prompt can be generated based on the FF NL instruction. For example, the LLM prompt can strictly conform to the FF NL instruction. As another example, and as described herein, the LLM prompt can be based on, but not strictly conform to, the FF NL instruction. For instance, the prompt can include some or all of the terms of the FF NL instruction, but can additionally include: scene descriptor(s) of the current environment (e.g., NL descriptor(s) of object(s) detected in the environment); an explanation generated in a prior pass utilizing the LLM (e.g., based on a prior LLM prompt of "explain how you would help when a user says 'I spilled my drink on the table, can you help'"); and/or term(s) to encourage prediction of step(s) by the LLM (e.g., including, at the end of the prompt "I would 1.").

The generated LLM prompt can be processed, using the LLM, to generate LLM output that models a probability distribution, over candidate word compositions, that is dependent on the instruction. Continuing with the working example, the highest probability decoding of the LLM output can be, for example, "use a vacuum". However, implementations disclosed herein do not simply blindly utilize the probability distribution of the LLM output in determining how to control a robot. Rather, implementations leverage the probability distribution of the LLM output, while also considering robotic skills that are actually performable by the robot, such as tens of, hundreds of, or thousands of pre-trained robotic skills. Some versions of those implementations generate, for each of the considered robotic skills, a corresponding task-grounding measure and a corresponding world-grounding measure. Further, some of those versions select a particular robotic skill, for implementation in response to the FF NL prompt, based on considering both the corresponding task-grounding measures and the corresponding world-grounding measures. For instance, a corresponding overall measure can be generated for each of the robotic skills as a function of the corresponding world-grounding and task-grounding measures for the robotic skill, and the particular robotic skill can be selected based on it having the best corresponding overall measure.

In generating a task-grounding measure for a robotic skill, an NL skill description of the robotic skill can be compared to the LLM output to generate the task-grounding measure. For example, the task-grounding measure can reflect the probability of the NL skill description in the probability distribution that is modeled by the LLM output. For instance, and continuing with the working example, the task-grounding measure for a first robotic skill having an NL skill description of "pick up a sponge" can reflect a higher probability than does the task-grounding measure for a second robotic skill having an NL skill description of "pick up a banana". Put another way, the probability distribution of the LLM output can characterize a higher probability for "pick up a sponge" than for "pick up a banana". Also, for instance, and continuing with the working example, the task-grounding measure for a third robotic skill having an NL skill description of "pick up a squeegee" can reflect a probability that is similar to that of the first robotic skill.

In generating a world-grounding measure for a robotic skill, current state data can optionally be considered, such as environmental state data and/or robot state data. Environmental state data reflects the state of one or more object(s) that are in the environment and that are in addition to the robot and can include, for example, vision sensor data and/or determinations made from processing the vision sensor data (e.g., object detection(s) and/or classification(s)). Robot state data reflects the state of one or more components of the robot and can include, for example, the current position of component(s) of the robot, a current velocity of component(s) of the robot, and/or other state data.

In some implementations or for some robotic skills, the description of the robotic skill can also be considered. In some of those implementations, the description of the robotic skill (e.g., a word embedding thereof) is processed and current state data is processed, using a trained value function model, to generate a value that reflects a probability of the robotic skill being successful based on the current state data—and the world-grounding measure is generated based on the value (e.g., conforms to the value). In some versions of those implementations, a candidate robotic action is also processed using the trained value function model and along with the description and the current state data. In some of those versions, multiple values are generated for a given robotic skill, where each is generated based on processing a different candidate robotic action, but utilizing the same description and the same current state data. In those versions, the world-grounding measure can be generated based on, for example, the generated value that reflects the highest probability of success.

Continuing with the working example, assume that current environmental state data includes an image, captured by a camera of the robot, and that the image captures a nearby sponge and a nearby banana, but does not capture any squeegee. In such a situation, the world-grounding measure for the first robotic skill having an NL skill description of "pick up a sponge" can reflect a high probability, the world-grounding measure for the second robotic skill having an NL skill description of "pick up a banana" can also reflect a high probability, and the world-grounding measure for the third robotic skill having an NL description of "pick up a squeegee" can reflect a low probability.

Continuing with the working example, the first robotic skill having an NL skill description of "pick up a sponge" can be selected for implementation based on considering both its task-grounding measure and its world-grounding measure, both of which reflect high probabilities. It is noted that, despite having a high world-grounding measure, the second robotic skill is not selected due to it having a low task-grounding measure. Likewise, despite having a high task-grounding measure, the third robotic skill is not selected due to it having a low world-grounding measure.

In these and other manners, implementations disclosed herein can consider both task-grounding measures and world-grounding measures in selecting a robotic skill to implement. This ensures that the selected robotic skill is both (a) likely to lead to successful completion of the task reflected by the FF NL input (as reflected by the task-grounding measure) and (b) likely to be successful if implemented by a robot in the current environment (as reflected by the world-grounding measure).

The above description is provided as an overview of only some implementations disclosed herein. These and other implementations are described in more detail herein, including in the detailed description and the claims.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A illustrates a process flow of how various example components can interact in selecting an initial robotic skill to implement responsive to the FF NL instruction of FIGS. 1A and 1n the environment of FIG. 1B.

FIG. 2B illustrates a process flow of how various example components can interact in selecting a next robotic skill to implement, following (or during) implementation of the robotic skill selected in FIG. 2A, and responsive to the FF NL instruction of FIGS. 1A and 1n the environment of FIG. 1B.

FIG. 3 is a flowchart illustrating an example method of leveraging an LLM in implementing robotic skill(s) to perform a task reflected in a FF NL instruction, according to implementations disclosed herein.

FIG. 4 is a flowchart illustrating an example method of generating a world-grounding measure for a robotic skill based on processing current state data and a skill description for the robotic skill.

DETAILED DESCRIPTION

Figure 1A:
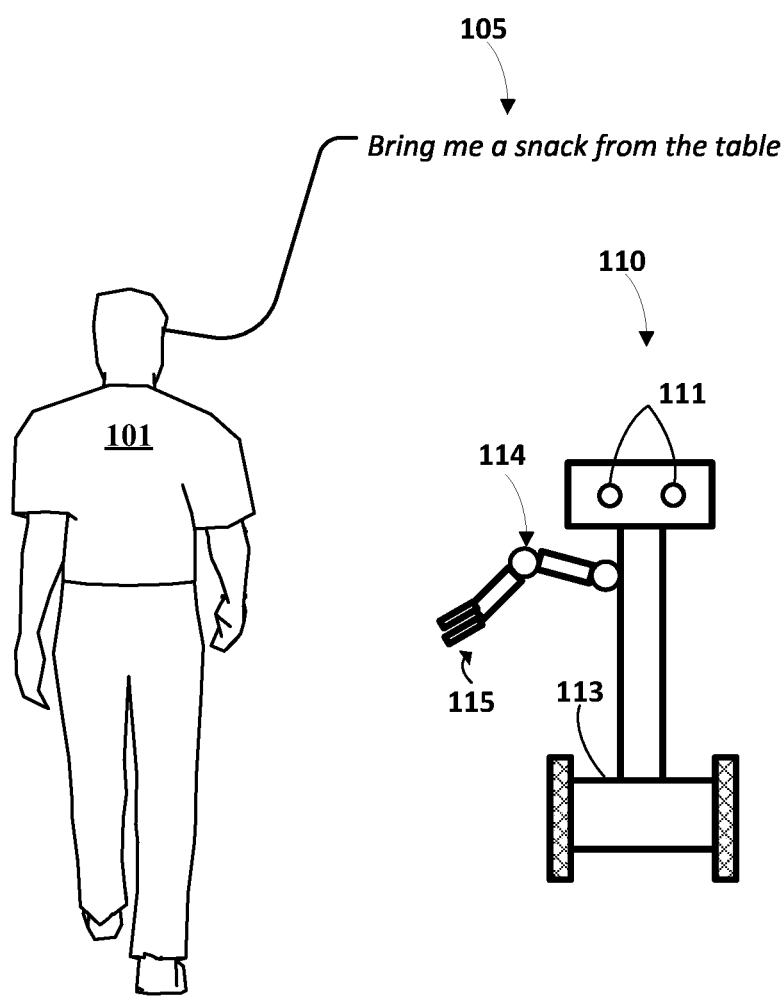
FIG. 1A illustrates an example of a human providing a free-form (FF) natural language (NL) instruction to an example robot.

Prior to turning to a detailed description of the drawings, a non-limiting overview of various implementations is provided.

In various implementations disclosed herein, a robot is equipped with a repertoire of learned robotic skills for atomic behaviors that are capable of low-level visuomotor control. Some of those implementations, instead of only prompting an LLM to simply interpret an FF NL high-level instruction, utilize the LLM output generated by the prompting to generate task-grounding measures that each quantify the likelihood that a corresponding robotic skill makes progress towards completing the high-level instruction. Further, a corresponding affordance function (e.g., a learned value function) for each of the robotic skills can be utilized to generate a world-grounding measure, for the robotic skill, that that quantifies how likely it is to succeed from the current stat. Yet further, both the task-grounding measures and the world-grounding measures can be utilized in determining which robotic skill to implement next in achieving the task(s) reflected by the high-level instruction. In these and other manners, implementations leverage that the LLM output describes the probability that each skill contributes to completing the instruction, and the affordance function describes the probability that each skill will succeed—and combining the two provides the probability that each skill will perform the instruction successfully. The affordance functions enable real-world grounding to be considered in addition to the task-grounding of the LLM output, and constraining the completions to the skill descriptions enables the LLM output to be considered in a manner that is aware of the robot's capabilities (e.g., in view of its repertoire of learned robotic skills). Furthermore, this combination results in a fully explainable sequence of steps that the robot will execute to accomplish a high-level instruction (e.g., the descriptions of the robotic skill(s) selected for implementation)—an interpretable plan that is expressed through language.

Accordingly, implementations leverage an LLM to provide task-grounding to determine useful actions for a high-level goal and leverage affordance functions (e.g., learned function(s)) to provide world-grounding to determine what action(s) are actually possible to execute in achieving the high-level goal. Some of those implementations utilize reinforcement learning (RL) as a way to learn language-conditioned value functions that provide affordances of what is possible in the real world.

Language models seek to model the probability p(W) of a text $W=\{w_0, w_1, w_2, \ldots, w_n\}$, a sequence of strings $w$. This is generally done through factorizing the probability via the chain rule to be $$p(W) = \prod_{j=0}^{n} p(w_j \mid w_{<j}),$$

such that each successive string is predicted from the previous. Recent breakthroughs initiated by neural network-based Attention architectures have enabled efficient scaling of so-called LLMs. Such LLMs include Transformers, LAMDA, PaLM, and others, each showing increasingly large capacity (billions of parameters and terabytes of text) and subsequent ability to generalize across tasks.

Implementations disclosed herein utilize the vast semantic knowledge contained in LLMs to determine useful tasks for solving high-level instructions. Some of those implementations further seek to accurately predict whether a skill (given by a NL descriptor) is feasible at a current state of an environment of a robot or other agent. In some versions of those implementations, or for at least some skill(s), temporal-difference-based (TD) reinforcement learning is utilized to accomplish this goal. In some of those versions, a Markov decision process is defined as (MDP) $\mathcal{M}=(\mathcal{S}, \mathcal{A}, \mathcal{P}, \mathcal{R}, \gamma)$, where $\mathcal{S}$ and $\mathcal{A}$ are state and action spaces, $\mathcal{P}:\mathcal{S}\times\mathcal{A}\times \mathcal{S}\to\mathbb{R}_+$ is a state-transition probability function, $\mathcal{R}:\mathcal{S}\times \mathcal{A}\to\mathbb{R}$ is a reward function and $\gamma$ is a discount factor. The goal of TD methods is to learn state or state-action value functions (Q-function) $Q^{\pi}(s, a)$, which represents the discounted sum of rewards when starting from state s and action a, followed by the actions produced by the policy π, i.e. $Q^{\pi}(s, a)=\mathbb{E}_{a\sim\pi(a|s)}\Sigma_t R(s_t, a_t)$. The Q-function, $Q^{\pi}(s, a)$ can be learned via approximate dynamic programming approaches that optimize the following loss:

$$L_{TD}(\theta) = \mathbb{E}_{(s,a,s')\sim D}[R(s, a) + \gamma\mathbb{E}_{a*\sim\pi}Q_{\theta}^{\pi}(s', a^*) - Q_{\theta}^{\pi}(s, a)],$$

where D is the dataset of states and actions and θ are the parameters of the Q-function.

For example, TD-based methods can be used to learn a value function, such as a value function that is additionally conditioned on the natural language descriptor of a skill, and utilize the value function to determine whether a given skill is feasible from the given state. It is worth noting that in the undiscounted, sparse reward case, where the agent receives the reward of 1.0 at the end of the episode if it was successful and 0.0 otherwise, the value function trained via RL corresponds to an affordance function that specifies whether a skill is possible in a given state.

Various implementations disclosed herein receive a user-provided natural language instruction i that describes a task that the robot should execute. The instruction can be long, abstract, and/or ambiguous. Further, implementations have access to a set of robotic skills Π, where each skill $\pi\in\Pi$ performs a short task, such as picking up a particular object, and comes with a short language description $\ell_{\pi}$ (e.g., "find a sponge") and an affordance function $p(c_{\pi}|s, \ell_{\pi})$, which indicates the probability of completing the skill with description $\ell_{\pi}$ successfully from state s. Intuitively, $p(c_{\pi}|s, \ell_{\pi})$ means "if I ask the robot to do $\ell_{\pi}$, will it do it?". In RL terminology, $p(c_{\pi}|s, \ell_{\pi})$ is the value function for the skill if the reward is 1 for successful completion and 0 otherwise.

As mentioned above, $\ell_{\pi}$ denotes the textual label of skill $\ell$ and $p(c_{\pi}|s, \ell_{\pi})$ denotes the probability that skill π with textual label $\ell_{\pi}$ successfully completes if executed from state s, where $c_{\pi}$ is a Bernoulli random variable. Processing a prompt, that is based on the natural language instruction i, using an LLM, generates LLM output that characterizes $p(\ell_{\pi}|i)$, the probability that a skill's textual label is a valid next step for the user's instruction. However, implementations disclosed herein recognize that it is important to consider the probability that a given skill successfully makes progress toward actually completing the instruction, which is denoted as $p(c_i|i, \ell_{\pi})$. Assuming that a skill that succeeds makes progress on i with probability $p(\ell_{\pi}|i)$ (i.e., its probability of being the right skill), and a skill that fails makes progress with probability zero, this can be factorized as $p(c_i|i, s, \ell_{\pi})\propto p(c_{\pi}|s, \ell_{\pi})p(\ell_{\pi}|i)$, which is sometimes be referred to herein as task-grounding or a task-grounding measure. Further, the probability of the skill being possible in the current state of the world can be factorized $p(c_{\pi}|s, \ell_{\pi})$, which is sometimes referred to herein as world-grounding or a world-grounding measure.

While LLMs can draw on a wealth of knowledge learned from copious amounts of text, they will not necessarily break down high-level commands into low-level instructions that are suitable for robotic execution. For example, if an LLM were asked "how would a robot bring me an apple", it may respond "a robot could go to a nearby store and purchase an apple for you". Though this response is a reasonable completion for the prompt, it is not necessarily actionable to an embodied agent, such as a robot, which may have a narrow and fixed set of abilities. Therefore, to adapt LLMs or other LMs, some implementations seek to implicitly inform LMs that the high-level instruction should be broken down into sequences of available low-level skills. One approach for accomplishing this is careful prompt engineering, a technique to coax an LM to a specific response structure. Prompt engineering provides examples in the context text ("prompt") for the LM that specify the task and the response structure which the LM will emulate.

Scoring language models open an avenue to constrained responses by outputting the probabilities assigned by a LM to fixed outputs. An LM represents a distribution over potential completions $p(w_k | w_{<k})$, where $w_k$ is a word that appears at a $k^{th}$ position in a text. While typical generation applications (e.g., conversational agents) sample from this distribution or decode the maximum likelihood completion, implementations disclosed herein can instead use the distribution to score a candidate completion selected from a set of options (e.g., a candidate skill description from a set of candidate skill descriptions). More formally, given a set of low-level robotic skills Π, their language descriptions $\ell_\Pi$ and an instruction i, the probability of a language description of a skill $\ell_\pi \in \ell_\Pi$ making progress towards executing the instruction i:$p(\ell_\pi | i)$ can be computed, which corresponds to querying the model over potential completions. The optimal skill according to the language model is computed via $\ell_\pi = \arg \max_{\ell_\pi \in \ell_\Pi} p(\ell_\pi | i)$.

In some implementations, the process proceeds by iteratively selecting a skill and appending it to the instruction. Practically, this can be viewed as a dialog between a user and a robot, in which a user provides the high level-instruction (e.g., "How would you bring me a coke can?") and the language model responds with an explicit sequence ("I would: 1.,", e.g., "I would: 1. find a coke can, 2. pick up the coke can, 3. bring it to you"). This has the added benefit of interpretability, as generative responses are generated, along with a notion of likelihood across many possible responses.

While such an approach enables effectively extracting knowledge from the language model, it leaves a major issue. Namely, while the decoding of the instruction obtained in this way always consists of skills that are available to the robot, these skills may not necessarily be appropriate for executing the desired high-level task in the specific situation that the robot is currently in. For example, if an FF NL prompt is "bring me an apple", the optimal set of skills changes if there is no apple in view of the robot or if the robot already has one in its gripper.

Accordingly, implementations seek to ground large language models through value functions—affordance functions that capture the log likelihood that a particular skill will be able to succeed in the current state. Given a skill $\pi \in \Pi$, its language description $\ell_\pi$ and its corresponding value function, which provides $p(c_\pi | s, \ell_\pi)$, the probability of completion for the skill described by $\ell_\pi$ in state s, an affordance space $\{p(c_\pi | s, \ell_\pi)\} \in \Pi$ can be formed. This value function space captures affordances across all skills. For each skill, the affordance function and the LLM probability can be multiplied together and ultimately the most probable skill selected—i.e., $\pi = \arg \max_{\pi \in \Pi} p(c_\pi | s, \ell_\pi) p(\ell_\pi | i)$.

Once the most probable skill is selected, the corresponding policy is executed by the agent and the LLM query is amended to include $\ell_\pi$ (the language description of the selected skill), and the process is run again until a termination token (e.g., "done") is chosen. This process is described in Algorithm 1, provided below. These two mirrored processes together lead to a probabilistic interpretation, where the LLM provides probabilities of a skill being useful for the high-level instruction and the affordances provide probabilities of successfully executing each skill. Combining these two probabilities together provides a probability that this skill furthers the execution of the high-level instruction commanded by the user.

---

Algorithm 1

Given: A high level instruction i, state $s_0$, and a set of skills Π and their language descriptions $\ell_\pi$

```
1:    n = 0, π = Ø
2:    while ℓ_{πn−1} ≠ done" do
3:        C = Ø
4:        for π ∈ Π and ℓ_π ∈ ℓ_Π do
```

5:         $p_\pi^{LLM} = p(\ell_\pi | i, \ell_{\pi n-1}, \dots, \ell_{\pi 0})$      ▷ Evaluate scoring of LLM 6:         $p_\pi^{affordance} = p(c_\pi | s_n, \ell_\pi)$      ▷ Evaluate affordance function 7:         $p_\pi^{combined} = p_\pi^{affordance} p_\pi^{LLM}$ 8:         $C = C \cup p_\pi^{combined}$

```
9:        end for
10:       π_n = argmax_{π∈Π}C
11:       Excute π_n(s_n) in the environment, updating state s_{n+1}
12:       n = n + 1
13:   end while
```

---

Implementations disclosed herein utilize a set of skills, each of which has a policy (for use in implementing the skill by the agent), a value function, and a short language description (e.g., "pick up the can"). These skills, value functions, and descriptions can be obtained in a variety of different ways. As one example, the individual skills can be trained with image-based behavioral cloning (e.g., following the BC-Z method) or reinforcement learning (e.g., following MT-Opt). Regardless of how a skill's policy is obtained, a value function can be utilized for the skill, such as value functions trained via TD backups. In order to amortize the cost of training many skills, multi-task BC and/or multi-task RL can be utilized for one or more skills. With multi-task BC and/or multi-task RL, instead of training a separate policy and value function per skill, multi-task policies and models are trained that are conditioned on the NL skill description. Note, however, that this description only corresponds to low level skills—it is still the LLM that is utilized to interpret the high-level instruction and break it up into individual low level skill descriptions.

In some implementations, to condition policies on language, a pre-trained large sentence encoder language model can be utilized. The sentence encoder language model parameters can be frozen during training and the embeddings, that are generated by passing in text descriptions of each skill, can be the embeddings used in conditioning the policies. The text embeddings are used as the input to the policy and value function that specify which skill should be performed. Since the language model used to generate the text embeddings is not necessarily the same as the language model used for planning, implementations are able to utilize different language models well suited for different abstraction levels—understanding planning with respect to many skills as opposed to expressing specific skills more granularly.

In some implementations, BC and/or RL policy training procedures can be used to obtain one or more of the language-conditioned policies and one or more of the value functions, respectively. As mentioned previously, for skill specification a set of short, natural language descriptions that are represented as language model embeddings can be utilized. Further, sparse reward functions can be utilized, such as ones with reward values of 1.0 at the end of an episode if the language command was executed successfully, and 0.0 otherwise. The success of language command execution can be, for example, rated by humans where the raters are given a video of the robot performing the skill, together with the given instruction. If two out of the three (or other threshold value) of raters agree that the skill was accomplished successfully, the episode is labelled with a positive reward. The action space of the policies can include, as one example and for a robot similar to that illustrated in FIG. 1A, six degrees of freedom of an end-effector pose as well as gripper open and close commands, x-y position and yaw orientation delta of the mobile base of the robot, and the terminate action.

Various robotic skills can be utilized in implementations disclosed herein, such as manipulation and navigation skills using a mobile manipulator robot. Such skills can include picking, placing and rearranging objects, opening and closing drawers, navigating to various locations, and placing objects in a specific configuration.

RL models utilized in some implementations, such as RL policy models and/or RL value function models, can use an architecture similar to MT-Opt, optionally with slight changes to support natural language inputs. As one particular example, a camera image (e.g., from a camera of a robot) can be processed by convolutional layers of an image tower of the architecture to generate an image embedding. The skill description can be embedded by the LLM (or other embedding model), then concatenated with the robot action and non-image parts of the state, such as the gripper height. To support asynchronous control, inference can optionally occur while the robot is still moving from the previous action. The model is optionally given how much of the previous action is left to execute. The conditioning input goes through a fully connected layer of an additional tower of the architecture, then is tiled spatially to generate an additional embedding, which is added/concatenated to the image embedding, before going through additional convolutional layers. The output is gated through a sigmoid, so the Q-value is always in [0, 1].

BC models utilized in some implementations, such as BC policy models, can use an architecture similar to BC-Z. As one particular example, the skill description can be embedded by a universal sentence encoder, then used to FiLM condition a Resnet-18 based architecture. Unlike the RL model, the previous action or gripper height may not be provided. Multiple FC layers can be applied to the final visual features, to output each action component (arm position, arm orientation, gripper, and the termination action).

It is noted that the flexibility of implementations disclosed herein, allows mixing and matching of policies and affordances from different methods. For example: for pick manipulation skills a single multi-task, language-conditioned policy can be used; for place manipulation skills a scripted policy, with an affordance based on the gripper state, can be used; and for navigation policies a planning-based approach, which is aware of the location(s) where specific object(s) can be found and corresponding distance measure(s), can be used. In some implementations, in order to avoid a situation where a skill is chosen but has already been performed or will have no effect, a cap for the affordances can be set indicating that the skill has been completed and the reward received.

As noted above, implementations disclosed herein enable utilization of many different policies and/or affordance functions through its probability interface. Accordingly, as skills become performant or as new skills are learned, it is straightforward to incorporate such skills into implementations disclosed herein.

As described above, implementations utilize an affordance function $p(c_\pi | s, \ell_\pi)$, which indicates the probability of completing the skill with description $\ell_\pi$ successfully from state s. Some learned policies that can be utilized herein produce a Q-function, $Q^\pi(s, a)$. Given $Q^\pi(s, a)$, with action a and state s, value $v(s) = \max_a Q^\pi(s, a)$ is found through optimization via the cross entropy method, similar to MT-Opt. For brevity, some example value functions are referenced below by their skill-text description $\ell_\pi$ and the affordance function as $p_{\ell_\pi}^{affordance}$. In some implementations, due to artifacts of training, the value functions require calibration to be directly applied as a probability. The parameters used for calibration can be determined, for example, empirically. Furthermore, and as referenced above, logic can be enforced that if a skill that has already been completed and the reward received (e.g., navigating to the table the robot is already in front of) then it should not be performed.

An example affordance function for "pick" skills follows. The trained value functions for pick skills generally have a minimum value for when a skill is not possible and a maximum when the skill is successful and thus we normalize the value function to get a affordance function with $$p_{pick}^{affordance} = \text{clamp}\left(\frac{v^{pick} - v_{min}^{pick}}{v_{max}^{pick} - v_{min}^{pick}}, 0, 1\right),$$

$$\text{where } v_{max}^{pick} = 0.5, v_{min}^{pick} = 0.2.$$

11
12

An example affordance function for "go to"/"navigate" skills follows. The affordance function of go to skills are based on the distanced (in meters) to the location.

$$p_{goto}^{affordance} = \text{clamp}\left(\frac{d_{max}^{goto} - d^{goto}}{d_{max}^{goto} - d_{min}^{goto}}, 0.1\right),$$

where $$d_{max}^{goto} = 100, d_{min}^{goto} = 0.$$

An example affordance function for a terminate skill can be to always set it to a small value, such as 0.1, represented by $$p_{terminate}^{affordance} = 0.1.$$

This can ensure the planning process terminates when there is no feasible skill to choose from.

Turning now to the Figures, FIG. 1A illustrates an example of a human 101 providing a free-form (FF) natural language (NL) instruction 105 of "bring me a snack from the table" to an example robot 110.

The robot 110 illustrated in FIG. 1A is a particular mobile robot. However, additional and/or alternative robots can be utilized with techniques disclosed herein, such as additional robots that vary in one or more respects from robot 110 illustrated in FIG. 1A. For example, a mobile forklift robot, an unmanned aerial vehicle ("UAV"), a non-mobile robot, and/or a humanoid robot can be utilized instead of or in addition to robot 110, in techniques described herein.

Robot 110 includes a base 113 with wheels provided on opposed sides thereof for locomotion of the robot 110. The base 113 may include, for example, one or more motors for driving the wheels of the robot 110 to achieve a desired direction, velocity, and/or acceleration of movement for the robot 110. The robot 110 also includes robot arm 114 with an end effector 115 that takes the form of a gripper with two opposing "fingers" or "digits."

Robot 110 also includes a vision component 111 that can generate vision data (e.g., images) related to shape, color, depth, and/or other features of object(s) that are in the line of sight of the vision component 111. The vision component 111 can be, for example, a monocular camera, a stereographic camera (active or passive), and/or a 3D laser scanner.

A 3D laser scanner can include one or more lasers that emit light and one or more sensors that collect data related to reflections of the emitted light. The 3D laser scanner can generate vision component data that is a 3D point cloud with each of the points of the 3D point cloud defining a position of a point of a surface in 3D space. A monocular camera can include a single sensor (e.g., a charge-coupled device (CCD)), and generate, based on physical properties sensed by the sensor, images that each includes a plurality of data points defining color values and/or grayscale values. For instance, the monocular camera can generate images that include red, blue, and/or green channels. Each channel can define a value for each of a plurality of pixels of the image such as a value from 0 to 255 for each of the pixels of the image. A stereographic camera can include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera can generate images that include a depth channel and red, blue, and/or green channels.

Robot 110 also includes one or more processors that, for example: process, using an LLM, an LLM prompt that is based on the FF NL input 105 to generate LLM output; determine, based on the LLM output, descriptions of robotic skills, and value function(s) for robotic skills, robotic skill(s) to implement in performing the robotic task; control the robot 110, during performance of the robotic task, based on the determined robotic skill(s); etc. For example, one or more processors of robot 110 can implement all or aspects of method 300 and/or 400 described herein. Additional description of some examples of the structure and functionality of various robots is provided herein.

Figure 1B:
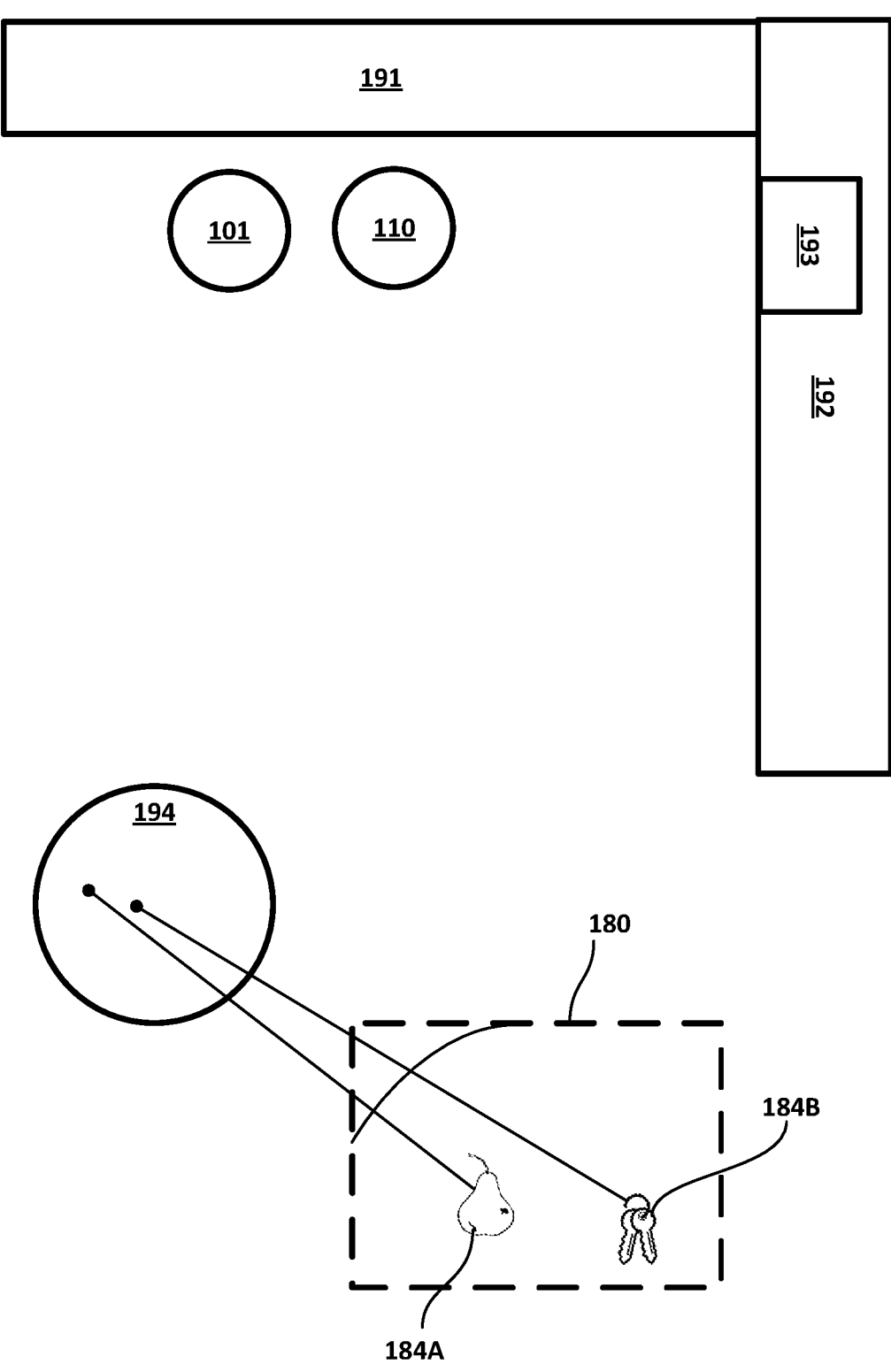
FIG. 1B illustrates a simplified birds-eye view of an example environment in which the human and the robot of FIG. 1A are located, and illustrates an example current vision data instance that can be captured in the environment.

Turning now to FIG. 1B, a simplified birds-eye view of an example environment, in which the human 101 and the robot 110 of FIG. 1A are located, is illustrated. The human 101 and the robot 110 are represented as circles in FIG. 1B. Further, environmental features 191, 192, 193, and 194 are illustrated in FIG. 1B. The environmental features 191, 192, 193, and 194 illustrate outlines of various landmarks the environment. For example, the environment could be an office kitchen or a work kitchen, and features 191 and 192 can be countertops, feature 193 can be a sink, and feature 194 can be a round table.

Also illustrated in FIG. 1B is an example current vision data instance 180 that can be captured in the environment and utilized, for example, in generating a world-grounding measure for a robotic skill. For example, robot 110 can capture the current vision data instance 180, using vision component 111. The vision data instance 180 captures a pear 184A and keys 184B that are both present on the round table represented by feature 194. It is noted that, in the birds-eye view, the pear and the keys are illustrated as dots for the sake of simplicity.

Turning now to FIG. 2A, a process flow of how various example components can interact in selecting an initial robotic skill to implement responsive to the FF NL instruction 150 of FIG. 1A and in the environment of FIG. 1B. The example components, illustrated in FIG. 2A, include an LLM engine 130, an LLM 150, a task-grounding engine 132, a world-grounding engine 134, value function model(s), a selection engine 130, and an implementation engine 136. One or more of the illustrated components can be implemented by the robot 110 (e.g., utilizing processor(s) and/or memory thereof) and/or utilizing remote computing device(s) (e.g., cloud-based server(s)) that are in network communication with the robot 110.

In FIG. 2A, the LLM engine 130 generates an LLM prompt 205A based on the FF NL input 105 ("bring me a snack from the table"). The LLM engine 130 can generate the LLM prompt 205A such that it conforms strictly to the FF NL input 105 or can generate the LLM prompt 205A such that it is based on, but does not strictly conform to, the FF NL input 105. For example, as illustrated by LLM prompt 205A1, a non-limiting example of LLM prompt 205A, the LLM prompt can be "How would you bring me a snack from the table? I would 1.". Such LLM prompt 205A1 includes "How would you" as a prefix and "I would 1." as a suffix, either or both of which can encourage prediction, in LLM output, of step(s) that are relevant to achieving the high-level task specified by the FF NL input 105.

In some implementations, the LLM engine 130 can optionally generate the LLM prompt 205A further based on one or more of scene descriptor(s) 202A of a current environment of the robot 110, prompt example(s) 203A, and/or an explanation 204A.

The scene descriptor(s) 202A can include NL descriptor(s) of object(s) currently or recently detected in the environment with the robot 110, such as descriptor(s) of object(s) determined based on processing image(s) or other vision data using object detection and classification machine learning model(s). For example, the scene descriptor(s) 202A can include "pear", "keys", "human", "table", "sink", and "countertops" and the LLM engine 130 can generate the LLM prompt 205A to incorporate one or more of such descriptors. For instance, the LLM prompt 205A can be "A pear, keys, a human, a table, a sink, and countertops are nearby. How would you bring the human a snack from the table. I would 1.".

The prompt example(s) 203A can include optionally manually engineered example(s) of desired output style(s). For example, they can include "in a step-by-step format" or "in a numbered list format" or "in the style of 1. first step, 2. second step, 3. third step, etc.". The prompt example(s) 203A can be prepended or otherwise incorporated into the LLM prompt 205A to encourage prediction, in LLM output, of content that is in the output style(s). The explanation 204A can be an explanation generated based on processing a prior LLM prompt, also based on the FF NL input, in a prior pass and utilizing the LLM 150. For example, the prior LLM prompt could be "explain how you would bring me a snack from the table", and the explanation 204A can be generated based on the highest probability decoding from the prior LLM output. For instance, the explanation 204A can be "I would find the table, then find a snack on the table, then bring it to you". The explanation 204A can be prepended to the LLM prompt 205A, replace term(s) of the FF NL input 105 in the LLM prompt 205A, or otherwise incorporated into the LLM prompt 205A.

The LLM engine 130 processes the generated LLM prompt 205A, using the LLM 150, to generate LLM output 206A. As described herein, the LLM output 206A can model a probability distribution, over candidate word compositions, and is dependent on the LLM prompt 205A.

The task grounding engine 132 generates task-grounding measures 208A and generates the task-grounding measures 208A based on the LLM output 206A and skill descriptions 207. Each of the skill descriptions 207 is descriptive of a corresponding skill that the robot 110 is configured to perform. For example, "go to the table" can be descriptive of a "navigate to table" skill that the robot can perform by utilizing a trained navigation policy with a navigation target of "table" (or of a location corresponding to a "table"). As another example, "go to the sink" can be descriptive of a "navigate to sink" skill that the robot can perform by utilizing the trained navigation policy with a navigation target of "sink" (or of a location corresponding to a "sink"). As yet another example, "pick up a bottle" can be descriptive of a "grasp a bottle" skill that the robot can perform utilizing grasping heuristics fine-tuned to a bottle and/or using a trained grasping network. As yet another example, "pick up keys" can be descriptive of a "grasp keys" skill that the robot can perform utilizing grasping heuristics fine-tuned to keys and/or using a trained grasping network. Although skill descriptions 207 includes descriptors for skills A-G in FIG. 2A, skill descriptions 207 can include descriptors for additional skills in various implementations (as indicated by the ellipsis). Such additional skills can correspond to alternative objects and/or can be for different types of robotic action(s) (e.g., "place", "push", "open", "close").

Each of the task-grounding measures 208A is generated based on a probability, of the corresponding skill description, in the LLM output 206A. For example, task-grounding measure A, "0.85", reflects the probability of the word sequence "go to the table" in the LLM output 206A. As another example, task-grounding measure B, "0.20", reflects the probability of the word sequence "go to the sink" in the LLM output 206A.

The world-grounding engine 134 generates world-grounding measures 211A for the robotic skills. In generating the world-grounding measures 211A for at least some of the robotic skills, the world-grounding engine 134 can generate the world-grounding measure based on environmental state data 209A and, optionally, further based on robot state data 210A and/or corresponding ones of the skill descriptions 207. Further, in generating the world-grounding measures 211A for at least some of the robotic skills, the world-grounding engine 134 can utilize one or more of the value function model(s) 152.

In some implementations, the world-grounding engine 134 can, for some robotic skill(s), generate fixed world-grounding measures. For example, any "place" robotic skills can always have a fixed measure, such as 1.0 or 0.9, or a "terminate" robotic skill (i.e., signifying task is complete) may always have a fixed measure, such as 0.1 or 0.2. In some implementations, the world-grounding engine 134 can additionally or alternatively, for some robotic skill(s), generate world-grounding measures based on a corresponding one of the value function model(s) 152 that is not machine-learning based (e.g., is not a neural network and/or is not trained). For example, a value function model can define that any "place" robotic skill should have a fixed measure, such as 1.0 or 0.9, when environmental state data 209A and/or robot state data 210A indicate that an object is being grasped by the robot 110, and another fixed measure, such as 0.0 or 0.1, otherwise. As another example, a value function for a "navigate to [object/location]" robotic skill can define the world-grounding measure is a function of the distance between the robot and the object/location, as determined based on environmental state data 209A and robot state data 210A. or a "terminate" robotic skill (i.e., signifying task is complete) may always have a fixed measure, such as 0.1 or 0.2.

In some implementations, the world-grounding engine 134 can additionally or alternatively, for some robotic skill(s), generate world-grounding measures based on a corresponding one of the value function model(s) 152 that is a trained value function model. In some of those implementations, the trained value function model can be a language-conditioned model. For example, the world-grounding engine 134 can, in generating a world-grounding measure for a robotic skill, process, using the language-conditioned model, a corresponding one of the skill descriptions 207 for the robotic skill, along with the environmental state data 209A and optionally along with the robot state data 210A, to generate a value that reflects a probability of the robotic skill being successful based on the current state data. The world-grounding engine can generate the world-grounding measure based on the generated value (e.g., to conform to the value). In some versions of those implementations, a candidate robotic action is also processed using the language conditioned model and along with the corresponding one of the skill descriptions 207, the environmental state data 209A, and optionally the robot state data 210A. In some of those versions, multiple values are generated, where each is generated based on processing a different candidate robotic action, but utilizing the same corresponding one of the skill descriptions 207, the same environmental state data 209A, and optionally the same robot state data 210A. In those versions, the world-grounding engine 134 can generate the world-grounding measure based on, for example, the generated value that reflects the highest probability of success. In some of those versions, the different candidate robotic actions can be selected using, for example, the cross entropy method. For example, N robotic actions can be randomly sampled initially and values generated for each, then N additional robotic actions sampled from around one of the initial N robotic actions based on that initial robotic action having the highest generated value. A trained value function model, used by the world-grounding engine 134 in generating world grounding measure(s) for a robotic skill, can also be utilized in actual implementation of the robotic skill by the robot 110.

The world-grounding measures 211A are generated based on the state of the robot 110 as reflected in the birds-eye view of FIG. 1B. Namely, when the robot 110 is still quite a distance away from the pear 184A and the keys 184B. Accordingly, world-grounding measures F and G, for "pick up a pear" and "pick up keys" respectively, are both relatively low ("0.10"). This reflects the low probability of an attempted grasp of either item being successful, due to the large distance between the robot 110 and the pear 184A and the keys 184B. The world-grounding measure A, "0.80", for "go to the table" reflects lower probability than does the world-grounding measure B, "0.85" for "go to the sink". This can be based on the robot 111 being closer to the sink 193 than it is to the table 194.

The selection engine 136 considers both the world-grounding measures 211A and the task-grounding measures 208A in selecting robotic skill A ("go to the table") and sends an indication 213A of the selected robotic skill A to the implementation engine 136. In response, the implementation engine 136 controls the robot 110 based on the selected robotic skill A. For example, the implementation engine 136 can control the robot using a navigation policy with a navigation target of "table" (or of a location corresponding to a "table").

In FIG. 2A, the selection engine 136 generates overall measures 212A by multiplying the world-grounding measures 211A and the task-grounding measures 208A, and selects the robotic skill A based on it having the highest of the overall measures 212A. It is noted that robotic skill A has the highest overall measure, despite it not having the highest world-grounding measure. Although FIG. 2A illustrates the overall measures 212A being generated by multiplying the world-grounding measures 211A and the task-grounding measures 208A, other techniques can be utilized in generating the overall measures 212A. For example, different weightings could be applied to the world-grounding measures 211A and the task-grounding measures 208A in the multiplying. For example, the world-grounding measures 211A can be weighted at 90% and the task-grounding measures 208A weighted at 100%.

Turning now to FIG. 2B, a process flow of how the various example components of FIG. 2A can interact in selecting a next robotic skill to implement, following (or during) implementation of the robotic skill A that was selected in FIG. 2A, and responsive to the FF NL instruction of FIG. 1A and in the environment of FIG. 1B.

In FIG. 2B, the LLM engine 130 generates an LLM prompt 205B based on the FF NL input 105 ("bring me a snack from the table") and further based on the selected skill descriptor 201B ("go to the table"), for robotic skill A, based on robotic skill A being selected and provided for implementation. The LLM engine 130 can generate the LLM prompt 205B such that it conforms strictly to the FF NL input 105 and the selected skill descriptor 201B or can generate the LLM prompt 205B such that it is based on, but does not strictly conform to, the FF NL input 105 and the selected skill descriptor 201B. For example, as illustrated by LLM prompt 205B1, a non-limiting example of LLM prompt 205B, the LLM prompt can be "How would you bring me a snack from the table? I would 1. Go to the table. 2.". Such LLM prompt 205B1 includes "How would you" as a prefix and "2." as a suffix, either or both of which can encourage prediction, in LLM output, of step(s) that are relevant to achieving the high-level task specified by the FF NL input 105. Further, such LLM prompt 205B1 includes the selected skill descriptor 201B of "go to the table", preceded by "1.", which can encourage prediction, in LLM output, of step(s) that are relevant to occurring after a step of "go to the table".

In some implementations, the LLM engine 130 can optionally generate the LLM prompt 205B further based on one or more of scene descriptor(s) 202B of a current environment of the robot 110 (which may have changed relative to FIG. 2A), prompt example(s) 203B (which can optionally vary from those of FIG. 2A), and/or an explanation 204B (which can optionally vary from that of FIG. 2A).

The LLM engine 130 processes the generated LLM prompt 205B, using the LLM 150, to generate LLM output 206B. As described herein, the LLM output 206B can model a probability distribution, over candidate word compositions, and is dependent on the LLM prompt 205B.

The task grounding engine 132 generates task-grounding measures 208B and generates the task-grounding measures 208B based on the LLM output 206A and skill descriptions 207. Each of the task-grounding measures 208B is generated based on a probability, of the corresponding skill description, in the LLM output 206B. For example, task-grounding measure A, "0.00", reflects the probability of the word sequence "go to the table" in the LLM output 206B. As another example, task-grounding measure B, "0.10", reflects the probability of the word sequence "go to the sink" in the LLM output 206B.

The world-grounding engine 134 generates world-grounding measures 211B for the robotic skills. In generating the world-grounding measures 211B for at least some of the robotic skills, the world-grounding engine 134 can generate the world-grounding measure based on environmental state data 209B and, optionally, further based on robot state data 210B and/or corresponding ones of the skill descriptions 207. It is noted that, due to robotic skill A being at least partially implemented at a time of FIG. 2B, the environmental state data 209B and the robot state data 210B will vary from their counterparts in FIG. 2A. Further, in generating the world-grounding measures 211B for at least some of the robotic skills, the world-grounding engine 134 can utilize one or more of the value function model(s) 152.

In some implementations, the world-grounding engine 134 can, for some robotic skill(s), generate fixed world-grounding measures. In some implementations, the world-grounding engine 134 can additionally or alternatively, for some robotic skill(s), generate world-grounding measures based on a corresponding one of the value function model(s) 152 that is not machine-learning based (e.g., is not a neural network and/or is not trained). In some implementations, the world-grounding engine 134 can additionally or alternatively, for some robotic skill(s), generate world-grounding measures based on a corresponding one of the value function model(s) 152 that is a trained value function model. In some of those implementations, the trained value function model can be a language-conditioned model.

The world-grounding measures 211B are generated based on the state of the robot 110 after robotic skill A has been at least partially implemented (i.e., the robot 110 is closer to the table 194 than it is as reflected in the birds-eye view of FIG. 1B). Accordingly, the robot 110 is closer to the pear 184A and the keys 184B (e.g., within reaching distance of both) that it is at a time of FIG. 2A. Accordingly, world-grounding measures F and G, for "pick up a pear" and "pick up keys" respectively, are both relatively high ("0.90").

The selection engine 136 considers both the world-grounding measures 211B and the task-grounding measures 208B in selecting robotic skill F ("pick up the pear") and sends an indication 213B of the selected robotic skill F to the implementation engine 136. In response, the implementation engine 136 controls the robot 110 based on the selected robotic skill F. For example, the implementation engine 136 can control the robot using a grasping policy, optionally with parameters fine-tuned for grasping a pear.

In FIG. 2B, the selection engine 136 generates overall measures 212B by multiplying the world-grounding measures 211B and the task-grounding measures 208B, and selects the robotic skill F based on it having the highest of the overall measures 212B. It is noted that robotic skill A has the highest overall measure, despite it not having the highest world-grounding measure and also not having the highest task-grounding measure. Although FIG. 2B illustrates the overall measures 212B being generated by multiplying the world-grounding measures 211B and the task-grounding measures 208B, other techniques can be utilized in generating the overall measures 212B. For example, different weightings could be applied to the world-grounding measures 211B and the task-grounding measures 208B in the multiplying. For example, the world-grounding measures 211B can be weighted at 90% and the task-grounding measures 208B weighted at 100%.

FIG. 3 is a flowchart illustrating an example method 300 of leveraging an LLM in implementing robotic skill(s) to perform a task reflected in a FF NL instruction, according to implementations disclosed herein. For convenience, the operations of the method 300 are described with reference to a system that performs the operations. This system can include one or more components of a robot, such as a robot processor and/or robot control system of robot 110, robot 520, and/or other robot and/or can include one or more components of a computer system, such as computer system 610. Moreover, while operations of method 300 are shown in a particular order, this is not meant to be limiting. One or more operations can be reordered, omitted or added.

At block 352, the system identifies a FF NL instruction.

At block 354, the system processes, using an LLM, an LLM prompt that is based on the FF NL instruction, to generate LLM output. Block 354 optionally includes sub-block 354A and/or sub-block 354B. At sub-block 354A, the system includes scene descriptor(s in the LLM prompt. At sub-block 354B, the system generates an explanation and includes the explanation in the LLM prompt.

At block 356, the system generates, based on the LLM output of block 354 and a corresponding NL skill description for each of multiple candidate robotic skills, a corresponding task-grounding measure. Block 356 optionally includes sub-block 356A, in which the system generates the task-grounding measure, of a candidate robotic skill, based on a probability of the NL skill description as reflected in a probability distribution of the LLM output.

At block 358, the system generates, based on current state data and for each of multiple of the candidate robotic skills, a corresponding world-grounding measure. Although illustrated positionally below block 356 in FIG. 3, it is noted that block 358 can occur in parallel with, or even before, block 356 in various implementations.

Block 358 optionally includes sub-block 358A and/or sub-block 358B. Optionally, sub-block 358A and/or sub-block 358B are only performed for certain of the candidate robotic skills.

At sub-block 358A, the system, in generating the world-grounding measure for a candidate robotic skill, processes, using a value function model, current environmental state data and/or current robot state data.

At sub-block 358B, the system, in generating the world-grounding measure for a candidate robotic skill using a value function model that is multi-skill and language conditioned, also processes an NL description of the robotic skill (e.g., an embedding thereof).

At block 360, the system selects, based on the task-grounding measures of block 356 and the world-grounding measures of block 358, a robotic skill to implement or selects a termination condition (which can be viewed as a particular robotic skill). A termination condition can be selected, for example, when the task-grounding measure for "done", "complete" or other termination description, corresponding to the termination condition, satisfies a threshold and/or when task-grounding measures, world-grounding measures, and/or overall measures for all robotic skills fails to satisfy the same or different threshold.

At block 362, the system determines whether a robotic skill was selected for implementation at block 360. If not, the system proceeds to block 364 and controlling the robot based on the FF NL instruction of block 352 is done. If so, the system proceeds to blocks 366 and 368.

At block 366, the system implements the selected robotic skill. At block 368, the system modifies the most recent LLM prompt, based on the skill description of the implemented skill. The system then proceeds back to block 354 and processes the LLM prompt as modified at block 368. The system also performs another iteration of blocks 356, 358, 360, and 362—and optionally blocks 366 and 368 (depending on the decision of block 362). This general process can continue until a termination condition is selected in an iteration of block 360.

FIG. 4 is a flowchart illustrating an example method of generating a world-grounding measure for a robotic skill based on processing current state data and a skill description for the robotic skill. For convenience, the operations of the method 400 are described with reference to a system that performs the operations. This system can include one or more components of a robot, such as a robot processor and/or robot control system of robot 110, robot 520, and/or other robot and/or can include one or more components of a computer system, such as computer system 610. Moreover, while operations of method 400 are shown in a particular order, this is not meant to be limiting. One or more operations can be reordered, omitted or added.

At block 452, the system generates an image embedding by processing a current image using an image tower of a trained language conditioned value function model. The image can be a current image captured by a vision component of the robot.

At block 454, the system selects a candidate action. For example, the system can select the candidate action by sampling from an action space.

At block 456, the system generates an additional embedding by processing the candidate action selected at block 454, a skill description of a robotic skill (e.g., an embedding thereof), and optionally robot state data, using an additional tower of the trained language conditioned value function model.

At block 458, the system generates a value based on processing, using additional layers of the trained language conditioned value function model, a concatenation of the image embedding and the additional embedding.

At block 460, the system determines whether to generate additional values for additional candidate actions. If not, the system proceeds to block 464. If so, the system proceeds to block 462 and selects an additional candidate action. In some iterations of block 462 this can include sampling from the action space without consideration of thus far generated values. In some later iterations of block 462, this can include sampling from the action space using the cross-entropy method and based on thus far generated values. For example, the sampling can be around or otherwise biased toward a portion of the action space that corresponds to the candidate action having the highest generated value thus far. The system then proceeds back to block 456 using the newly selected candidate action, but the same skill description and, optionally, the same robot state.

At block 464, the system generates a world-grounding measure, for a robotic skill corresponding to the skill description (used in iteration(s) of block 456) based on the maximum value, of the values generated in iteration(s) of block 458.

Figure 5:
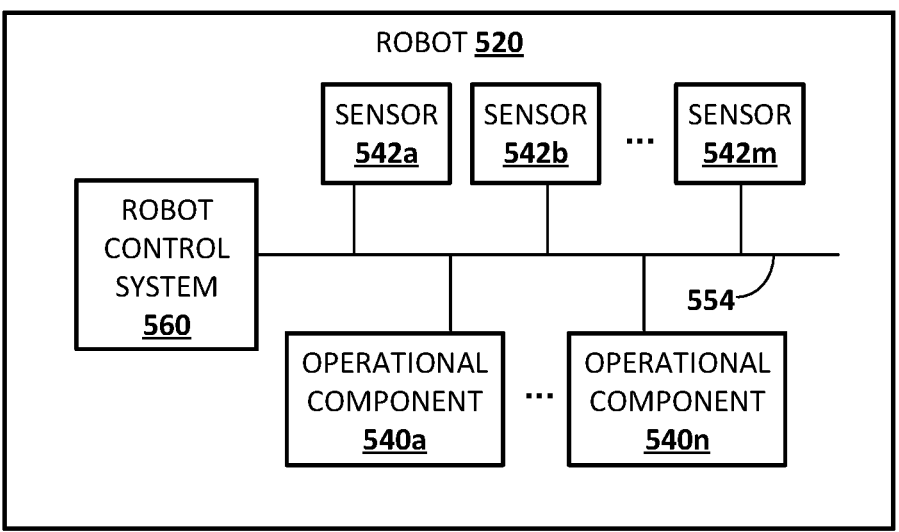
FIG. 5 schematically depicts an example architecture of a robot.

FIG. 5 schematically depicts an example architecture of a robot 520. The robot 520 includes a robot control system 560, one or more operational components 540a-540n, and one or more sensors 542a-542m. The sensors 542a-542m may include, for example, vision sensors, light sensors, pressure sensors, pressure wave sensors (e.g., microphones), proximity sensors, accelerometers, gyroscopes, thermometers, barometers, and so forth. While sensors 542a-m are depicted as being integral with robot 520, this is not meant to be limiting. In some implementations, sensors 542a-m may be located external to robot 520, e.g., as standalone units.

Operational components 540a-540n may include, for example, one or more end effectors and/or one or more servo motors or other actuators to effectuate movement of one or more components of the robot. For example, the robot 520 may have multiple degrees of freedom and each of the actuators may control the actuation of the robot 520 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 520. In some implementations, the robot 520 may comprise a "brain box" that may include all or aspects of the control system 560. For example, the brain box may provide real time bursts of data to the operational components 540a-n, with each of the real time bursts comprising a set of one or more control commands that dictate, inter alia, the parameters of motion (if any) for each of one or more of the operational components 540a-n. In some implementations, the robot control system 560 may perform one or more aspects of method(s) described herein, such as method 300 of FIG. 3 and/or method 400 of FIG. 4.

As described herein, in some implementations all or aspects of the control commands generated by control system 560, in controlling a robot during performance of a robotic task, can be generated based on robotic skill(s) determined to be relevant for the robotic task based on world-grounding and task-grounding measures as described herein. Although control system 560 is illustrated in FIG. 5 as an integral part of the robot 520, in some implementations, all or aspects of the control system 560 may be implemented in a component that is separate from, but in communication with, robot 520. For example, all or aspects of control system 560 may be implemented on one or more computing devices that are in wired and/or wireless communication with the robot 520, such as computing device 610.

Figure 6:
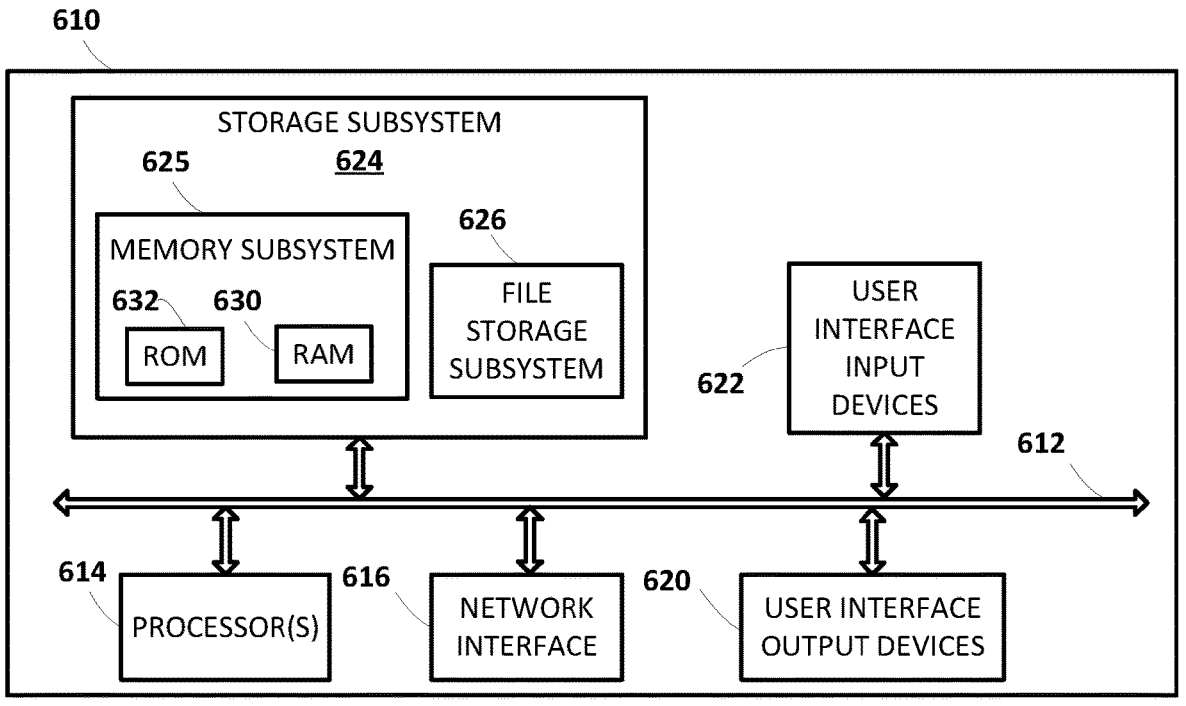
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 300 of FIG. 3 and/or method 400 of FIG. 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method implemented by one or more processors is provided that includes identifying an instruction and processing the instruction using a language model (LM) (e.g., a large language model (LLM)) to generate LM output. The instruction can be a free-form natural language instruction generated based on user interface input that is provided by a user via one or more user interface input devices. The generated LM output can mode a probability distribution, over candidate word compositions, that is dependent on the instruction. The method further includes identifying a robotic skill, that is performable by a robot, and a skill description that is a natural language description of the robotic skill. The method further includes generating, based on the LM output and the skill description, a task-grounding measure for the robotic skill. The task grounding measure can reflect a probability of the skill description in the probability distribution of the LM output. The method further includes generating, based on the robotic skill and current environmental state data, a world-grounding measure. for the robotic skill. The world grounding measure can reflect a probability of the robotic skill being successful based on the current environmental state data. The current environmental state data can include sensor data captured by one or more sensor components of the robot in a current environment of the robot. The method further includes determining, based on both the task-grounding measure and the world-grounding measure, to implement the robotic skill in lieu of additional robotic skills that are each performable by the robot. The method further includes, in response to determining to implement the robotic skill, causing the robot to implement the robotic skill in the current environment.

These and other implementations of the technology disclosed herein can include one or more of the following features.

In some implementations, the method further includes: identifying an additional robotic skill, of the additional robotic skills, and an additional skill description that is a natural language description of the additional robotic skill; and generating, based on the LM output and the additional skill description, an additional task-grounding measure, for the additional robotic skill. The additional task-grounding measure can reflect an additional probability of the additional skill description in the probability distribution. In those implementations, the method further includes generating, based on the additional robotic skill and the current environmental state data, an additional world-grounding measure for the additional robotic skill. The additional world-grounding measure can reflect an additional probability of the additional robotic skill being successful based on the current environmental state data. Further, in those implementations, determining, based on both the task-grounding measure and the world-grounding measure, to implement the robotic skill in lieu of additional robotic skills that are each performable by the robot, can include determining to implement the robotic skill based on the task-grounding measure, the world-grounding measure, the additional task-grounding measure, and the additional world-grounding measure. For example, it can include: generating an overall measure, for the robotic skill, that is based on both the task-grounding measure and the world-grounding measure; generating an additional overall measure, for the additional robotic skill, that is based on both the additional task-grounding measure and the additional world-grounding measure; and determining to implement the robotic skill in lieu of the additional robotic skill based on comparison of the overall measure to the additional overall measure.

In some implementations, the method further includes, in response to determining to implement the robotic skill: processing, using the LM, the instruction and the skill description of the robotic skill to generate further LM output that models a further probability distribution, over the candidate word compositions, that is dependent on the instruction and the skill description; identifying an additional robotic skill, of the additional robotic skills, and an additional skill description that is a natural language description of the additional robotic skill; generating, based on the further LM output and the additional skill description, an additional task-grounding measure for the additional robotic skill; generating, based on the additional robotic skill and updated current environmental state data, an additional world-grounding measure for the additional robotic skill; determining, based on both the additional task-grounding measure and the additional world-grounding measure, to implement the additional robotic skill in lieu of the robotic skill or other of the additional robotic skills that are each performable by the robot; and in response to determining to implement the additional robotic skill: causing the robot to implement the additional robotic skill in the current environment. The updated current environmental state data can include updated sensor data captured by the one or more sensor components in the current environment and after implementation of the robotic skill.

In some implementations, the method further includes, in response to determining to implement the robotic skill: processing, using the LM, the instruction and the skill description of the robotic skill to generate further LM output that models a further probability distribution, over the candidate word compositions, that is dependent on the instruction and the skill description; identifying a termination skill, of the additional robotic skills, and a termination description that is a natural language description of performance of the instruction being complete; generating, based on the further LM output and the termination description, a termination task-grounding measure for the termination skill; generating, based on the termination skill and updated current environmental state data, a termination world-grounding measure, for the termination skill; determining, based on both the additional task-grounding measure and the additional world-grounding measure, to implement the termination skill in lieu of the robotic skill or other of the additional robotic skills that are each performable by the robot; and in response to determining to implement the termination skill: causing the robot to cease further implementation of any control commands that are in furtherance of the instruction. The updated current environmental state data can include updated sensor data captured by the one or more sensor components in the current environment and after implementation of the robotic skill.

In some implementations, generating, based on the robotic skill and the current environmental state data, the world-grounding measure, includes processing the robotic skill and the current environmental state data, using a trained value function, to generate value function output that comprises the world-grounding measure. In some versions of those implementations, the current environmental state data includes vision data (e.g., a multi-channel image), of the sensor data, the vision data being captured by one or more vision components of the one or more sensor components of the robot. In some additional or alternative versions of those implementations, the trained value function is a language-conditioned value function and processing the robotic skill using the trained value function comprises processing the skill description of the robotic skill. In some additional or alternative versions of those implementations, the trained value function is trained to correspond to an affordance function, and the value function output specifies whether the robotic skill is possible based on the current environmental state data. In some additional or alternative versions of those implementations, the value function is a machine learning model trained using reinforcement learning.

In some implementations, determining, based on both the task-grounding measure and the world-grounding measure, to implement the robotic skill in lieu of the additional robotic skills includes: generating an overall measure as a function of the task-grounding measure and the world-grounding measure; comparing the overall measure to corresponding additional measures that are each for a corresponding one of the additional robotic skills; and determining to implement the robotic skill based on the comparing. In some versions of those implementations, the overall measure is a weighted or non-weighted combination of the task-grounding measure and the world-grounding measure. In some additional or alternative versions of those implementations, the task-grounding measure is a task-grounding probability, the world-grounding measure is a world-grounding probability, and generating the overall measure includes generating a product based on multiplying the task-grounding probability by the world-grounding probability, and using the product as the overall measure.

In some implementations, causing the robot to implement the robotic skill in the current environment includes causing execution of a language-conditioned robotic control policy, conditioned on the skill description of the robotic skill. In some versions of those implementations, the language-conditioned robotic control policy includes a machine learning model. In some versions of those implementations, the language-conditioned robotic control policy is trained using reinforcement learning and/or imitation learning.

In some implementations, the instruction strictly conforms to natural language input provided by the user via the user interface input.

In some implementations, the instruction does not strictly conform to natural language input provided by the user via the user interface input. In some of those implementations, the method further includes determining that the natural language input is not in the form of a question and, in response to determining that the natural language input is not in the form of a question, generating the instruction by modifying the natural language input to be in the form of a question.

In some implementations, the LM is a large language model (LLM).

In some implementations, a method implemented by one or more processors is provided that includes identifying an instruction that is a free-form natural language instruction generated based on user interface input that is provided by a user via one or more user interface input devices. The method further includes processing the instruction, using a language model (LM), to generate LM output, such as LM output that models a probability distribution, over candidate word compositions, that is dependent on the instruction. The method further includes, for each of a plurality of robotic skills that are each performable by a robot: generating, based on the LM output and a skill description for the robotic skill, a task-grounding measure for the robotic skill (e.g., one that reflects a probability of the skill description in the probability distribution); generating, based on the robotic skill and current environmental state data, a world-grounding measure, for the robotic skill (e.g., one that reflects a probability of the robotic skill being successful based on the current environmental state data); and generating an overall measure, for the robotic skill, based on the task-grounding measure and the world-grounding measure. The current environmental state data includes sensor data captured by one or more sensor components of the robot in a current environment of the robot. The method further includes selecting, based on the overall measures for the robotic skills, a given skill of the robotic skills. The method further includes, in response to selecting the given robotic skill, causing the robot to implement the given robotic skill in the current environment.

In some implementations, a method implemented by processor(s) is provided and includes identifying an instruction that is a free-form natural language instruction, such as one generated based on user interface input that is provided by a user via one or more user interface input devices. The method further includes processing a language model (LM) prompt, that is generated based on the instruction, using an LM (e.g., a large language model (LLM)), to generate LM output that models a probability distribution, over candidate word compositions, that is dependent on the LM prompt. The method further includes identifying a robotic skill, that is performable by a robot, and a skill description that is a natural language description of the robotic skill. The method further includes generating, based on the LM output and the skill description, a task-grounding measure, for the robotic skill, that reflects a probability of the skill description in the probability distribution of the LM output. The method further includes generating, based on the robotic skill and current environmental state data, a world-grounding measure, for the robotic skill, that reflects a probability of the robotic skill being successful based on the current environmental state data. The current environmental state data optionally includes sensor data captured by one or more sensor components of the robot in a current environment of the robot. The method further includes determining, based on both the task-grounding measure and the world-grounding measure, to implement the robotic skill in lieu of additional robotic skills that are each performable by the robot. The method further includes, in response to determining to implement the robotic skill: causing the robot to implement the robotic skill in the current environment.

In some implementations, a method implemented by processor(s) is provided and includes identifying an instruction that is a free-form natural language instruction, such as one generated based on user interface input that is provided by a user via one or more user interface input devices. The method further includes generating a large language model (LLM) prompt based on the instruction. The method further includes processing the LLM prompt, using an LLM, to generate LLM output that models a probability distribution, over candidate word compositions, that is dependent on the LLM prompt. The method further includes, for each of a plurality of robotic skills that are each performable by a robot: generating, based on the LLM output and a skill description for the robotic skill, a task-grounding measure for the robotic skill, that reflects a probability of the skill description in the probability distribution; generating, based on the robotic skill and current environmental state data, a world-grounding measure, for the robotic skill, that reflects a probability of the robotic skill being successful based on the current environmental state data; and generating an overall measure, for the robotic skill, based on the task-grounding measure and the world-grounding measure. The method further includes selecting, based on the overall measures for the robotic skills, a given skill of the robotic skills. The method further includes, in response to selecting the given robotic skill, causing the robot to implement the given robotic skill in the current environment.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers and/or one or more robots that include one or more processors operable to execute stored instructions to perform a method such as one or more of the methods described herein.

The invention claimed is:

1. A method implemented by one or more processors, the method comprising:
   identifying an instruction, the instruction being a free-form natural language instruction generated based on user interface input that is provided by a user via one or more user interface input devices;
   processing a language model (LM) prompt, that is generated based on the instruction, using an LM, to generate LM output that models a probability distribution, over candidate word compositions, that is dependent on the LM prompt;
   identifying a robotic skill, that is performable by a robot, and a skill description that is a natural language description of the robotic skill;
   generating, based on the LM output and the skill description, a task-grounding measure, for the robotic skill, that reflects a probability of the skill description in the probability distribution of the LM output;
   generating, based on the robotic skill and current environmental state data, a world-grounding measure, for the robotic skill, that reflects a probability of the robotic skill being successful based on the current environmental state data,
      wherein the current environmental state data comprises sensor data captured by one or more sensor components of the robot in a current environment of the robot;
   determining, based on both the task-grounding measure and the world-grounding measure, to implement the robotic skill in lieu of additional robotic skills that are each performable by the robot; and
   in response to determining to implement the robotic skill:
      causing the robot to implement the robotic skill in the current environment.

2. The method of claim 1, further comprising:
   identifying an additional robotic skill, of the additional robotic skills, and an additional skill description that is a natural language description of the additional robotic skill;
   generating, based on the LM output and the additional skill description, an additional task-grounding measure, for the additional robotic skill, that reflects an additional probability of the additional skill description in the probability distribution;
   generating, based on the additional robotic skill and the current environmental state data, an additional world-grounding measure, for the additional robotic skill, that reflects an additional probability of the additional robotic skill being successful based on the current environmental state data;
   wherein determining, based on both the task-grounding measure and the world-grounding measure, to implement the robotic skill in lieu of additional robotic skills that are each performable by the robot, comprises:
      generating an overall measure, for the robotic skill, that is based on both the task-grounding measure and the world-grounding measure;
      generating an additional overall measure, for the additional robotic skill, that is based on both the additional task-grounding measure and the additional world-grounding measure; and
      determining to implement the robotic skill in lieu of the additional robotic skill based on comparison of the overall measure to the additional overall measure.

3. The method of claim 1, further comprising:
   in response to determining to implement the robotic skill:
      processing, using the LM, a further LM prompt that is based on the instruction and the skill description of the robotic skill to generate further LM output that models a further probability distribution, over the candidate word compositions, that is dependent on the further LM prompt;
      identifying an additional robotic skill, of the additional robotic skills, and an additional skill description that is a natural language description of the additional robotic skill;
      generating, based on the further LM output and the additional skill description, an additional task-grounding measure, for the additional robotic skill, that reflects a probability of the additional skill description in the further probability distribution;
      generating, based on the additional robotic skill and updated current environmental state data, an additional world-grounding measure, for the additional robotic skill, that reflects a probability of the additional robotic skill being successful based on the updated current environmental state data,
         wherein the updated current environmental state data comprises updated sensor data captured by the one or more sensor components in the current environment and after implementation of the robotic skill;
      determining, based on both the additional task-grounding measure and the additional world-grounding measure, to implement the additional robotic skill in lieu of the robotic skill or other of the additional robotic skills that are each performable by the robot; and in response to determining to implement the additional robotic skill:

causing the robot to implement the additional robotic skill in the current environment.

4. The method of claim 1, further comprising:

in response to determining to implement the robotic skill:

processing, using the LM, a further LM prompt that is based on the instruction and the skill description of the robotic skill to generate further LM output that models a further probability distribution, over the candidate word compositions, that is dependent on the further LM prompt;

identifying a termination skill, of the additional robotic skills, and a termination description that is a natural language description of performance of the instruction being complete;

generating, based on the further LM output and the termination description, a termination task-grounding measure, for the termination skill, that reflects a probability of the termination skill description in the further probability distribution;

determining, based on the additional task-grounding measure, to implement the termination skill in lieu of the robotic skill or other of the additional robotic skills that are each performable by the robot; and in response to determining to implement the termination skill:

causing the robot to cease further implementation of any control commands that are in furtherance of the instruction.

5. The method of claim 1, wherein generating, based on the robotic skill and the current environmental state data, the world-grounding measure, comprises:

processing the robotic skill and the current environmental state data, using a trained value function, to generate value function output that comprises the world-grounding measure.

6. The method of claim 5, wherein the current environmental state data comprises vision data, of the sensor data, the vision data being captured by one or more vision components of the one or more sensor components of the robot.

7. The method of claim 5, wherein the trained value function is a language-conditioned value function and wherein processing the robotic skill using the trained value function comprises processing the skill description of the robotic skill.

8. The method of claim 5, wherein the trained value function is trained to correspond to an affordance function, and the value function output specifies whether the robotic skill is possible based on the current environmental state data.

9. The method of claim 5, wherein the value function is a machine learning model trained using reinforcement learning.

10. The method of claim 1, wherein determining, based on both the task-grounding measure and the world-grounding measure, to implement the robotic skill in lieu of the additional robotic skills comprises:

generating an overall measure as a function of the task-grounding measure and the world-grounding measure;

comparing the overall measure to corresponding additional measures that are each for a corresponding one of the additional robotic skills; and determining to implement the robotic skill based on the comparing.

11. The method of claim 10, wherein the overall measure is a weighted or non-weighted combination of the task-grounding measure and the world-grounding measure.

12. The method of claim 11, wherein the task-grounding measure is a task-grounding probability, the world-grounding measure is a world-grounding probability, and generating the overall measure comprises generating a product based on multiplying the task-grounding probability by the world-grounding probability, and using the product as the overall measure.

13. The method of claim 1, wherein causing the robot to implement the robotic skill in the current environment comprises:

causing execution of a language-conditioned robotic control policy, conditioned on the skill description of the robotic skill.

14. The method of claim 1, wherein the LM prompt strictly conforms to natural language input provided by the user via the user interface input.

15. The method of claim 1, wherein the LM prompt does not strictly conform to natural language input provided by the user.

16. The method of claim 15, further comprising:

generating the LM prompt to include, as a suffix, content that solicits generation of a next step.

17. The method of claim 15, further comprising:

generating the LM prompt to include one or more scene descriptors that are descriptive of a current environment of the robot.

18. The method of claim 1, wherein the LM is a large language model (LLM).

19. A method implemented by one or more processors, the method comprising:

identifying an instruction, the instruction being a free-form natural language instruction generated based on user interface input that is provided by a user via one or more user interface input devices;

generating a large language model (LLM) prompt based on the instruction;

processing the LLM prompt, using an LLM, to generate LLM output that models a probability distribution, over candidate word compositions, that is dependent on the LLM prompt;

for each of a plurality of robotic skills that are each performable by a robot:

generating, based on the LLM output and a skill description for the robotic skill, a task-grounding measure for the robotic skill, that reflects a probability of the skill description in the probability distribution;

generating, based on the robotic skill and current environmental state data, a world-grounding measure, for the robotic skill, that reflects a probability of the robotic skill being successful based on the current environmental state data, wherein the current environmental state data comprises sensor data captured by one or more sensor components of the robot in a current environment of the robot; and generating an overall measure, for the robotic skill, based on the task-grounding measure and the world-grounding measure;

selecting, based on the overall measures for the robotic skills, a given skill of the robotic skills; and in response to selecting the given robotic skill:

causing the robot to implement the given robotic skill in the current environment.

20. A robot, comprising:

one or more actuators;

an end effector;

memory storing instructions;

one or more processors, operable to execute the instructions to:

identify an instruction that is a free-form natural language instruction;

generate a large language model (LLM) prompt based on the instruction;

processing the LLM prompt, using an LLM, to generate LLM output that models a probability distribution, over candidate word compositions, that is dependent on the LLM prompt;

for each of a plurality of robotic skills that are each performable by the robot:

generate, based on the LLM output and a skill description for the robotic skill, a task-grounding measure for the robotic skill, that reflects a probability of the skill description in the probability distribution;

generate, based on the robotic skill and current environmental state data, a world-grounding measure, for the robotic skill, that reflects a probability of the robotic skill being successful based on the current environmental state data; and generate an overall measure, for the robotic skill, based on the task-grounding measure and the world-grounding measure;

select, based on the overall measures for the robotic skills, a given skill of the robotic skills; and in response to selecting the given robotic skill:

control one or more of the actuators to implement the given robotic skill in the current environment.

\* \* \* \* \*